Nov. 12, 1935.  W. L. MERRILL ET AL  2,021,077
INDEXING PUNCH PRESSES
Filed Sept. 29, 1934   9 Sheets-Sheet 4
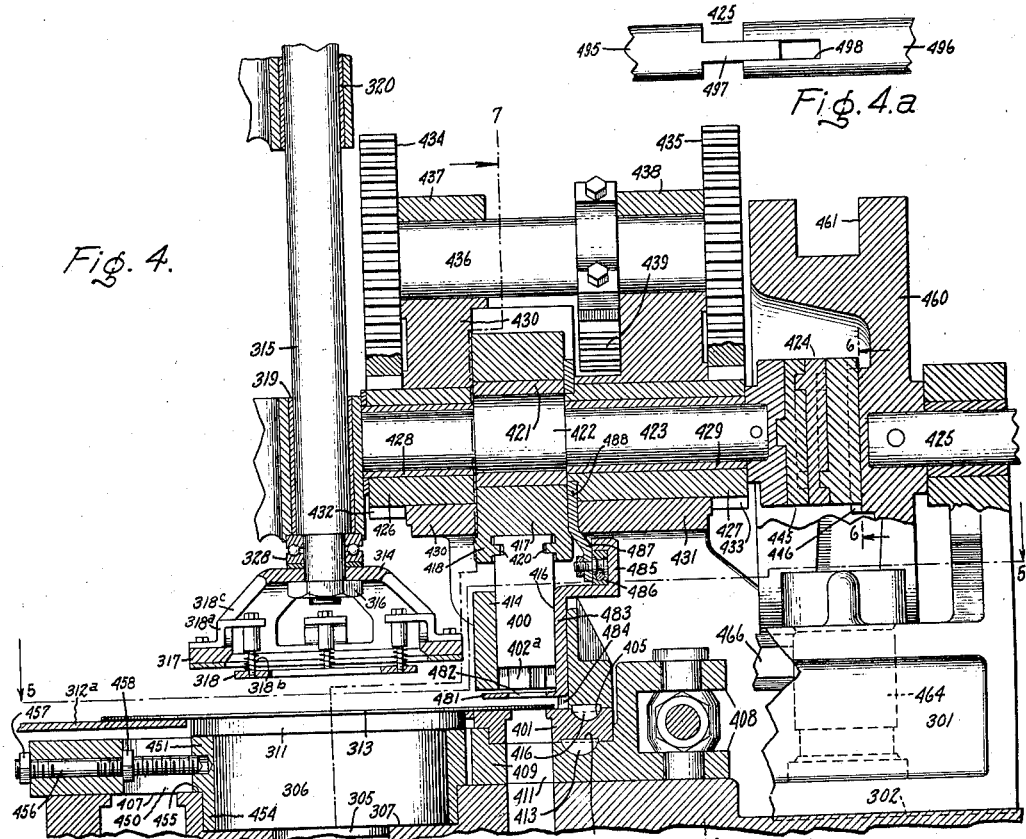
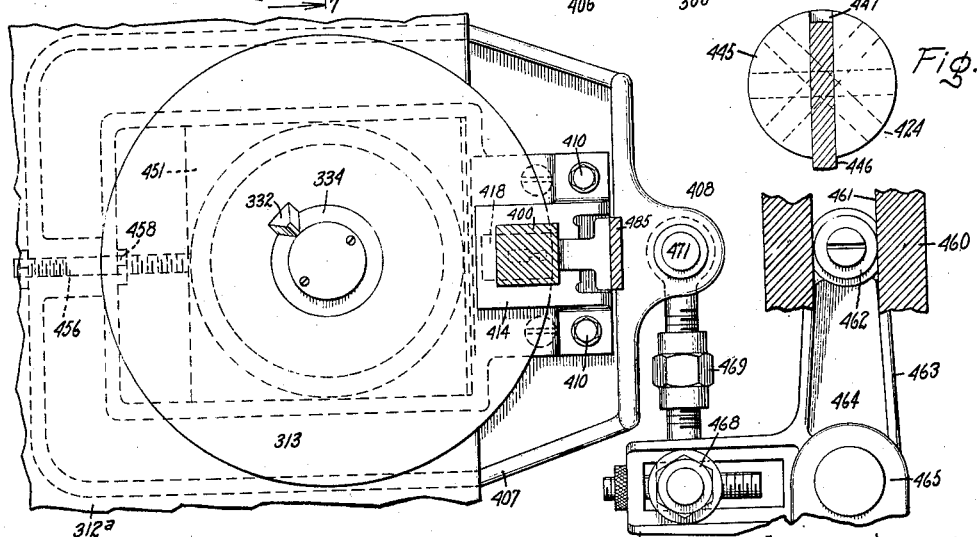
Inventors:
Wilbur L. Merrill,
Frederick E. Fisher,
by Harry E. Dunham
Their Attorney

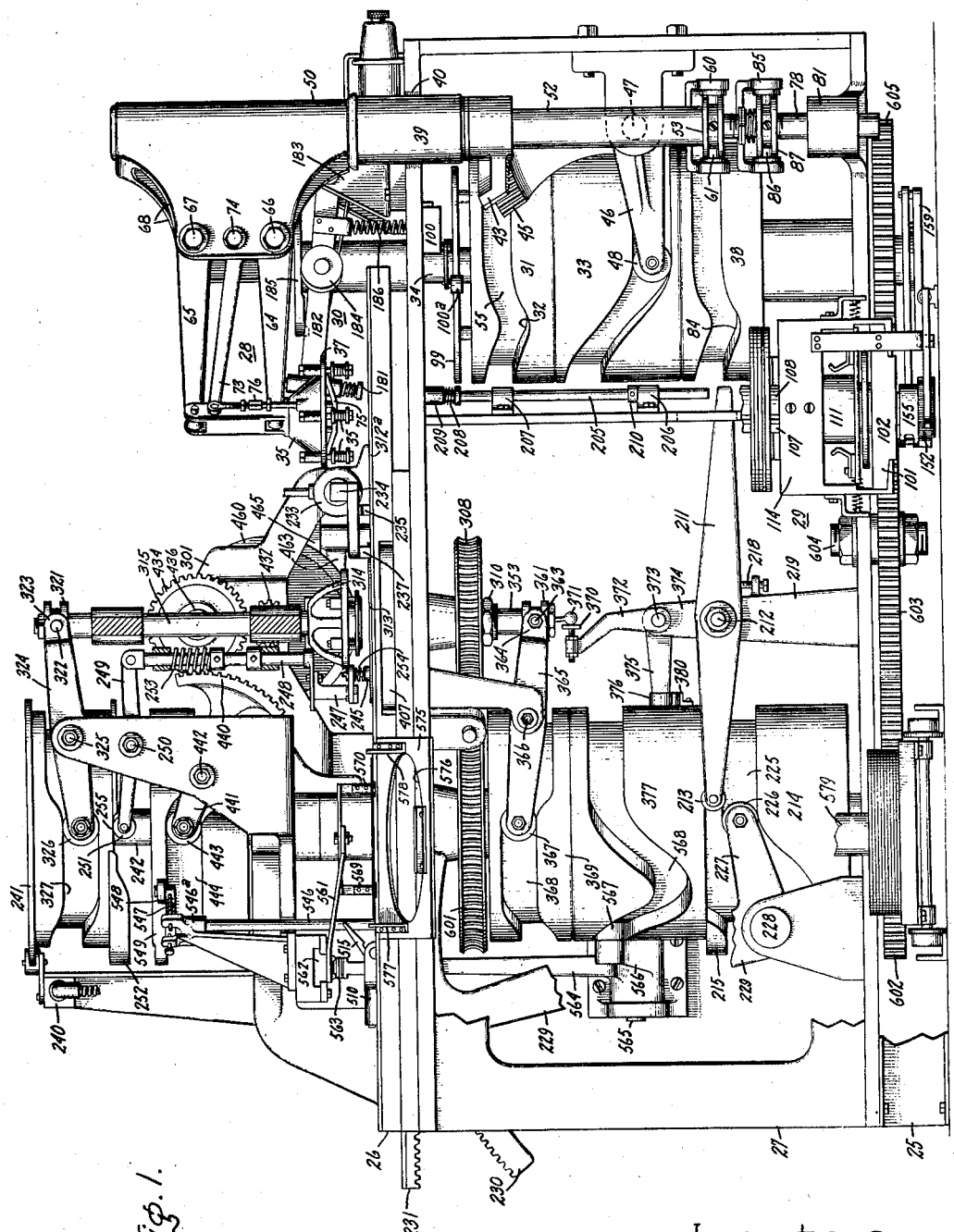

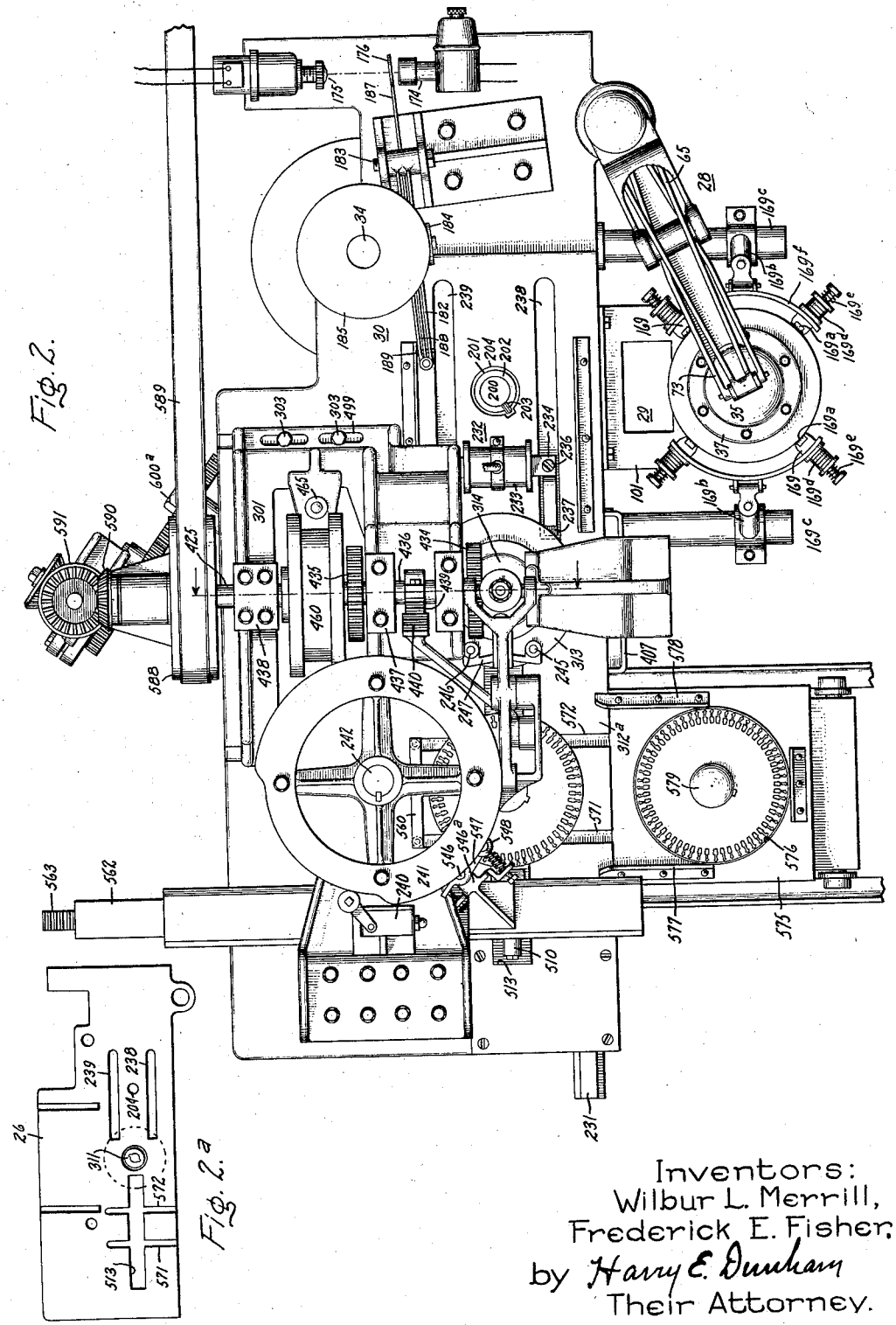

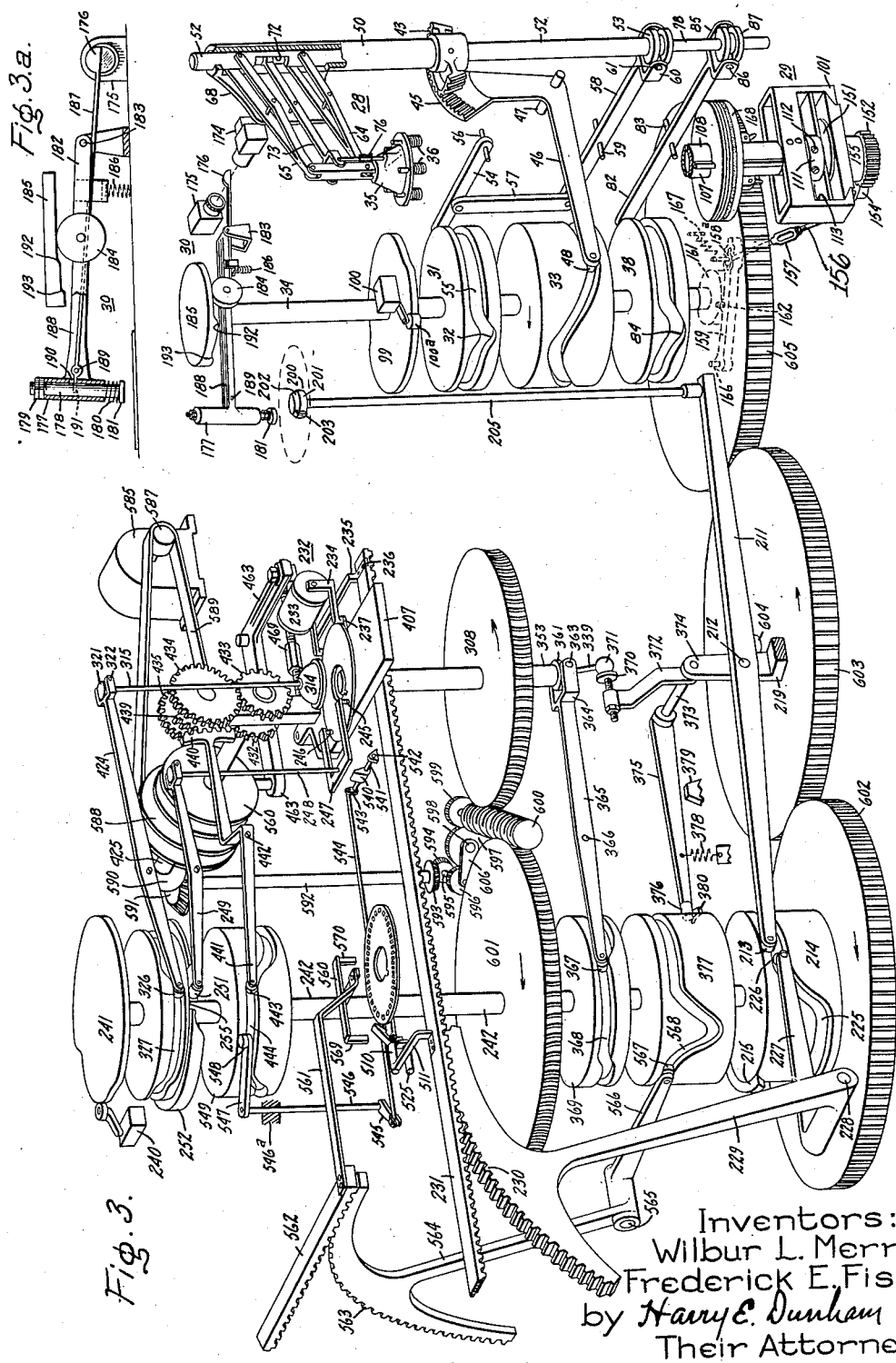

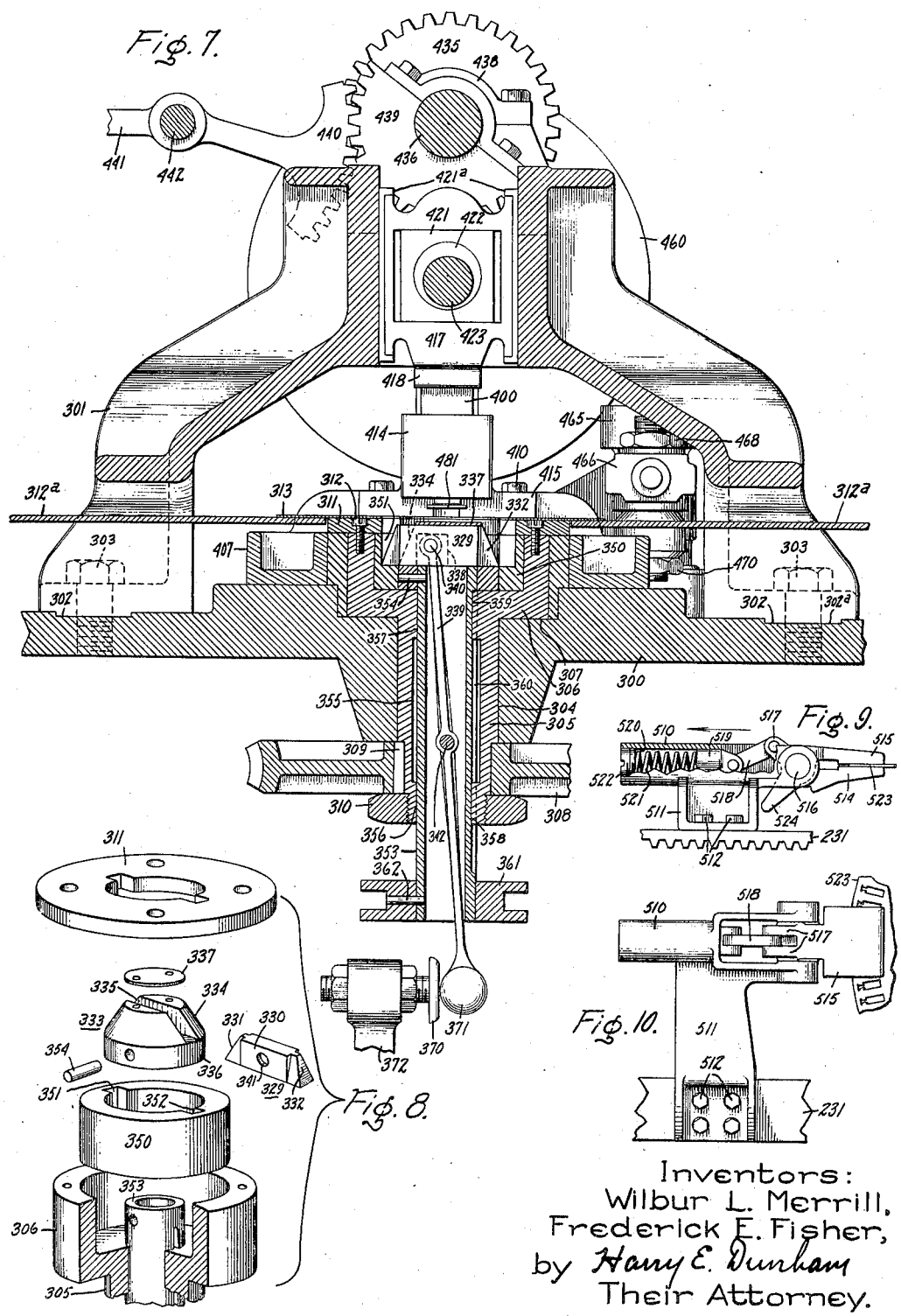

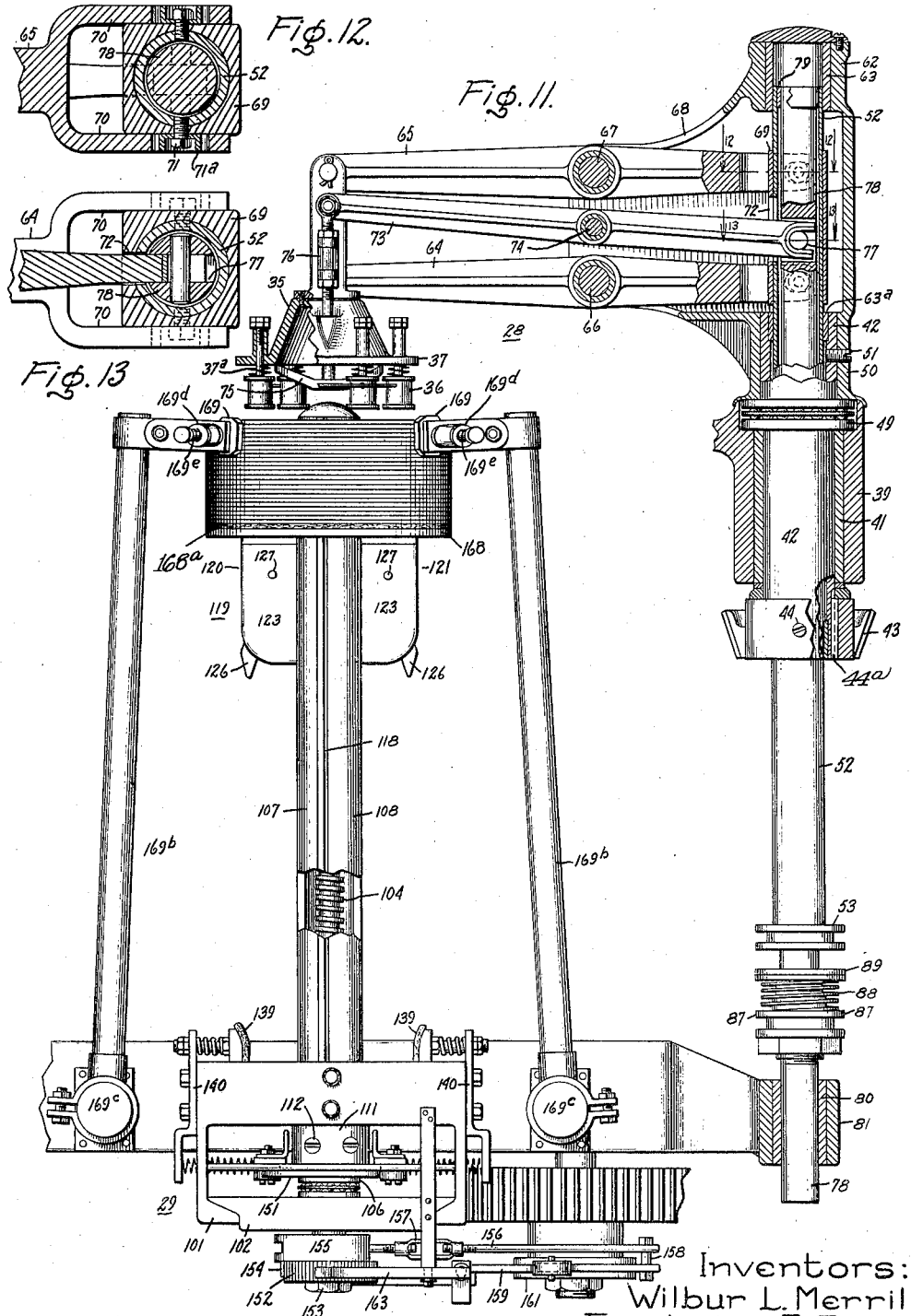

Nov. 12, 1935. W. L. MERRILL ET AL 2,021,077
INDEXING PUNCH PRESSES
Filed Sept. 29, 1934 9 Sheets-Sheet 7
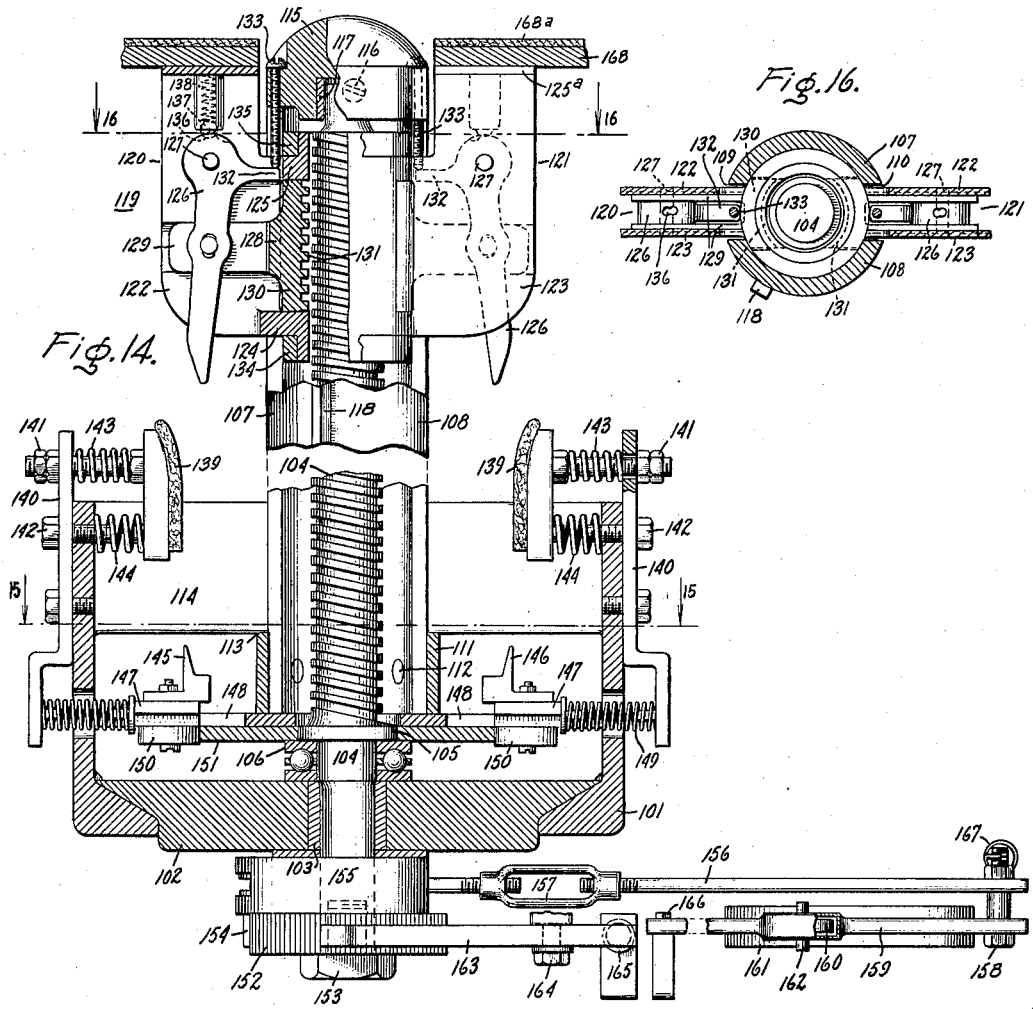
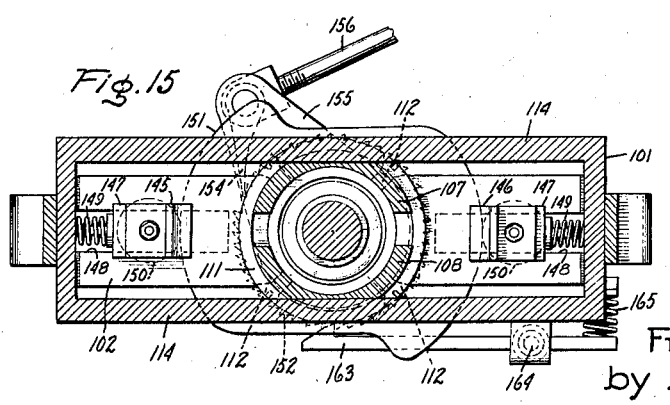
Inventors:
Wilbur L. Merrill,
Frederick E. Fisher,
by Harry E. Dunham
Their Attorney.

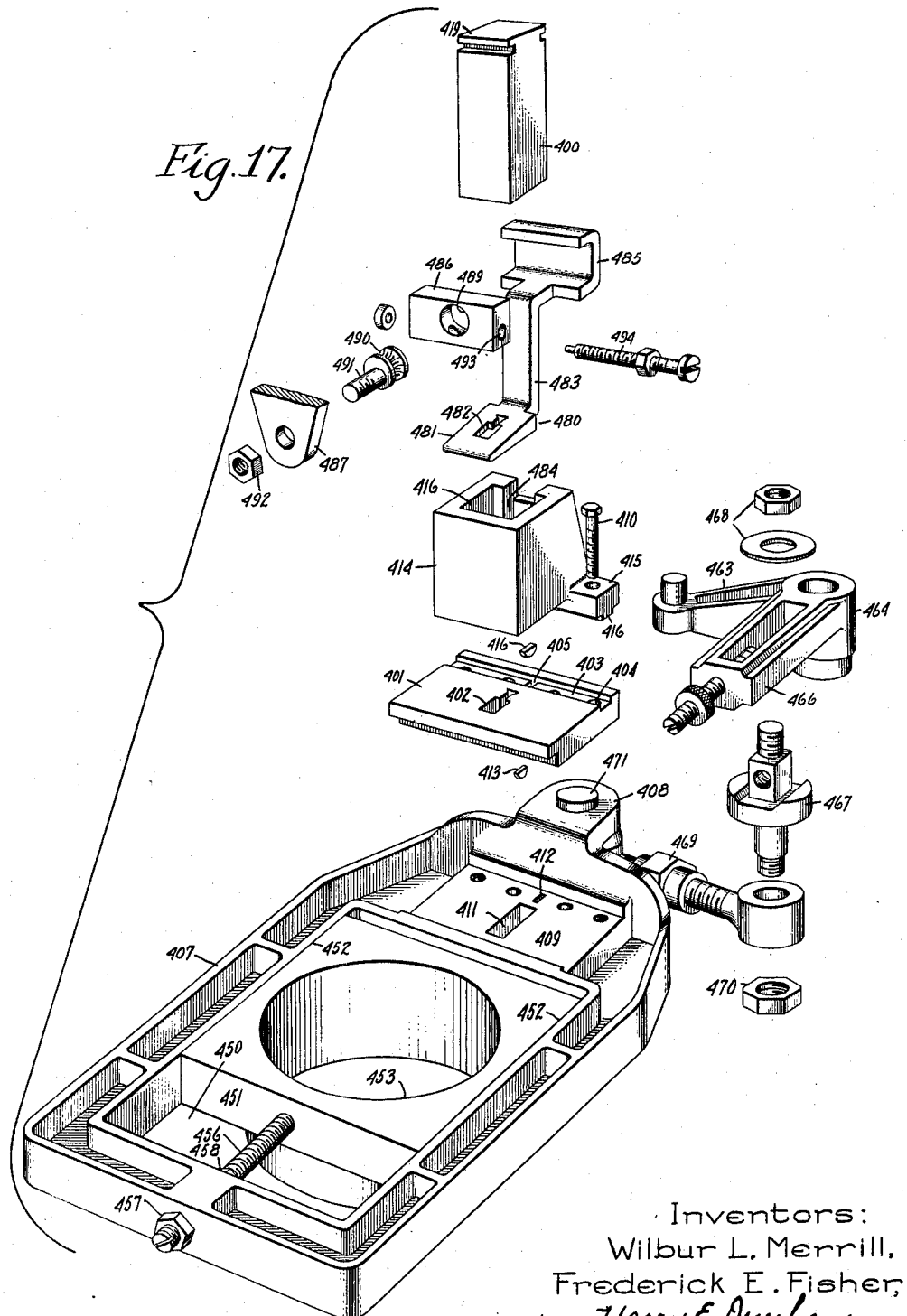

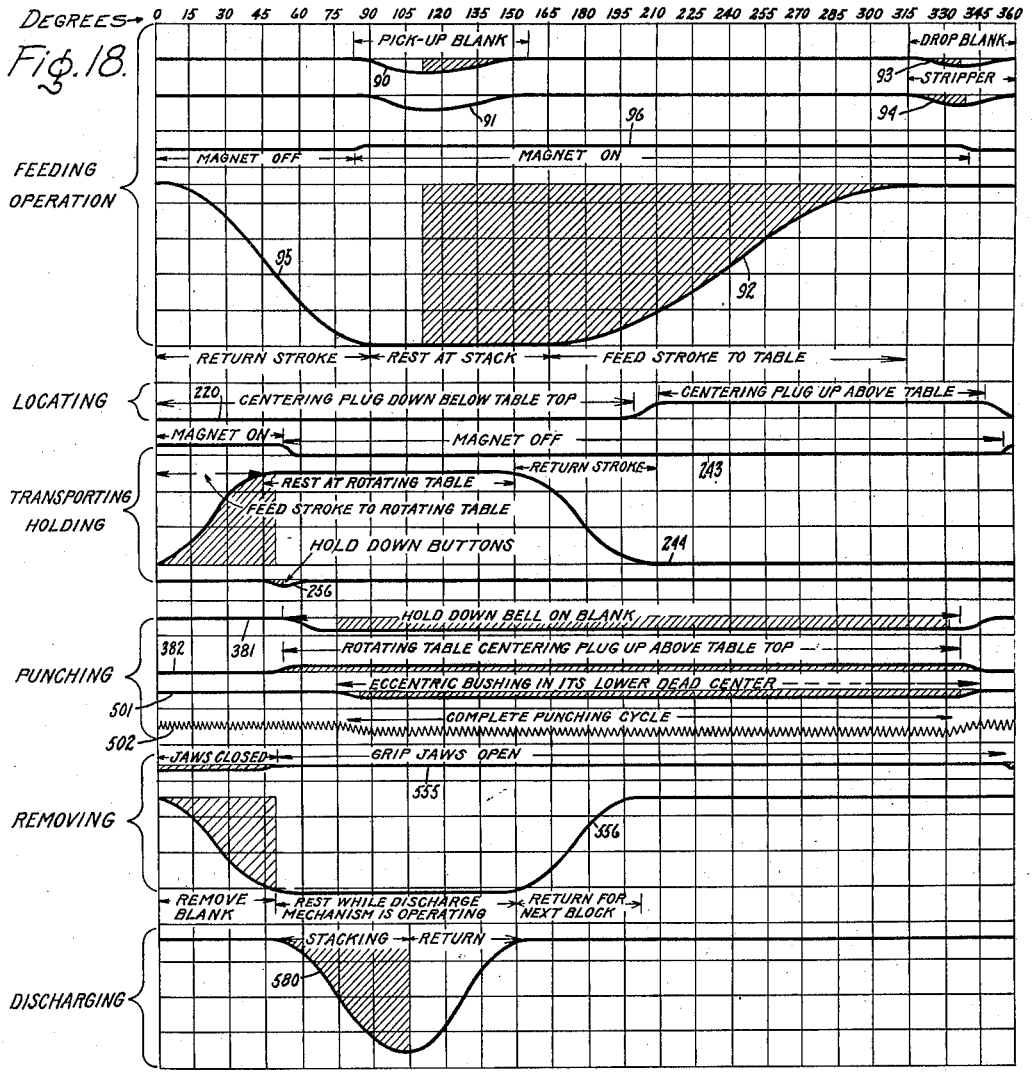
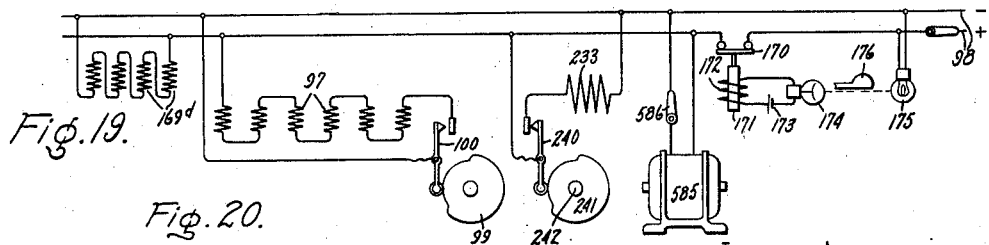
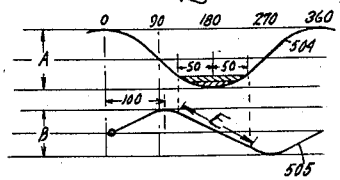

Patented Nov. 12, 1935

2,021,077

UNITED STATES PATENT OFFICE 2,021,077

INDEXING PUNCH PRESSES

Wilbur L. Merrill and Frederick E. Fisher, Scotia, N. Y., assignors to General Electric Company, a corporation of New York Application September 29, 1934, Serial No. 746,084

56 Claims. (Cl. 164—87)

The present invention relates to indexing punch presses for performing a plurality of punching operations on a movably arranged work piece. The work piece may be in the form of a strip, a rod or a disk of metal or like material. During normal punching operation a plurality of perforations, notches, openings or deformations are provided consecutively at predetermined time intervals. From another viewpoint, the punching effects the removing, severing or deforming of material from a work piece moved through the punch press at a definite speed so that the portions acted upon have a predetermined spacing on the work piece. Such indexing punch presses are used, for example, in the manufacture of laminations for electrical machines. In this case annular disks or blanks are provided with a plurality of notches which usually are uniformly spaced apart. Such machines may further be used for removing or severing pieces from a straight, curved or helically wound strip of material at predetermined distances on the strip.

The present invention is of particular significance in connection with indexing punch presses for punching annular or circular blanks. However, certain novel principles involved in the improved punch press may be applied to other kinds of presses. The terms "punch" and "punching" accordingly are used hereinafter in their broadest (broader than commonly used) sense to denote both punch presses and shears, punching, shearing and deforming operations. A piece to be punched or sheared is hereinafter termed a blank and the piece after being punched or sheared is termed a work.

The general object of our invention is to provide an improved construction and arrangement of indexing punch presses whereby the time for punching a blank is considerably reduced. This is partly accomplished according to our invention by the provision of a flying punch or severing tool. By a "flying punch" we mean a tool which is arranged to perform during operation a reciprocating motion, that is, an upward and downward movement or stroke and at the same time a swinging motion somewhat like a pendulum. The last movement may be considered as a backward and forward or an oscillating or a shuttle motion. The provision of such a punch or severing tool permits the carrying out of the punching operation while the blank is moving at a definite, uniform speed. In the case of a disk to be punched, the disk may be rotated continuously at a uniform speed during the punching operation or, from another viewpoint, no rest period of the blank to be punched is necessary while the punch acts upon the blank.

For a better understanding of the feature just mentioned and other objects and features of our invention, attention is directed to the following description in connection with the accompanying drawings.

In the drawings we have shown an indexing punch press embodying our invention, which press may be used for punching laminations for electrical machines.

Fig. 1 is a front view of the press;
Fig. 2 is a plan view;
Fig. 2a is a plan view of the machine table;
Fig. 3 is a diagrammatic view of the working mechanism of the press;
Fig. 3a is a detail view of the blank thickness gauging mechanism;
Fig. 4 is a sectional view of the punch mechanism;
Fig. 4a is a detail view of the drive shaft for the punch mechanism;
Fig. 5 is a sectional view along lines 5—5 of Fig. 4;
Fig. 6 is a sectional view along line 6—6 of a universal coupling in Fig. 4;
Fig. 7 is a view along line 7—7 of Fig. 4;
Fig. 8 is a perspective exploded view of a rotatable table and a key-holding and actuating mechanism of Fig. 7;
Fig. 9 is a detail view of a blank-gripping and removing mechanism of Fig. 1;
Fig. 10 is a plan view of Fig. 9;
Fig. 11 is a detail view of a blank-feeding mechanism;
Figs. 12 and 13 are enlarged sectional views along lines 12—12 and 13—13 respectively of Fig. 11;
Fig. 14 is a detail view of a blank-raising device;
Fig. 15 is a sectional view along line 15—15 of Fig. 14;
Fig. 16 is a sectional view along line 16—16 of Fig. 14;
Fig. 17 is an exploded perspective view of the punch oscillating mechanism;
Fig. 18 is a diagram comprising a plurality of curves indicating the movements and the operation of various elements of the punch press;
Fig. 19 is an electric connection diagram of the press, and
Fig. 20 is a diagram indicating the relation between the movement of the punch and the die.

The punch press shown in the drawings comprises the following mechanisms:—

1. A feeding mechanism for feeding a blank to a table of the punch press.

2. A locating mechanism for properly locating or positioning a single blank on the table and checking the blank.

3. A mechanism for transporting the located blank to the punch mechanism.

4. A punch mechanism for punching the blank.

5. A mechanism for removing a work, that is, a punched blank, from the punch mechanism.

6. A mechanism for discharging the work from the table of the punch press.

7. A power agency.

The different mechanisms are driven by a power agency such as an electric motor and they are interconnected and correlated so that each mechanism performs a definite movement at a certain time during the operation.

In the following the seven mechanisms are described in the order aforementioned.

1. FEEDING MECHANISM

The aforementioned mechanisms of the machine are supported on a machine frame comprising a base 25, and a table 26 (Fig. 1) secured to the base by supporting members 27. The feeding mechanism when viewed from the front of the machine is disposed at the right-hand end thereof. As its name indicates, it serves for picking up blanks from a stack of blanks and feeding them to the table of the machine. The blanks in the present instance are annular disks provided with a central bore and a key notch, into which a plurality of uniformly spaced openings have to be punched near the outer periphery.

The feeding mechanism comprises three essential elements: (a) a first element or blank swinging mechanism 28 (Fig. 3) for picking a single blank or disk from a stack of blanks and placing it on the machine table, (b) a second element or stack raising mechanism 29 for properly supporting the stack of blanks and gradually raising the stack of blanks so that the upper blank of the stack is always at a substantially definite level, and (c) a third element or gauging mechanism 30 for gauging the blank on the table to insure that only a single blank has been placed on the table and to automatically bring the whole machine to a stop in case more than a single blank has been placed on the table. The stack of blanks is disposed in front of the right-hand portion of the table.

(a) *Blank swinging mechanism*

The first element 28 (Figs. 3 and 11) of the feeding mechanism includes means for picking up a blank from the stack, lifting the blank away from the stack, swinging the blank over to a central portion of the table and lowering the blank and placing it on the table. The lifting and lowering of the blank is effected by means including a lifting and lowering cam 31 which has a cylindrical groove 55 with two depressions 32 at substantially diametrically opposite points. The swinging motion is accomplished by means including a swing cam 33. These two cams are provided on a rotatable cam shaft 34. The blank is held during the feeding operation on a feed bell 35 by electromagnetic means including six electromagnets 36 yieldingly secured to a rim 37 of the feed bell by means including a spring 37ª for each magnet. The electromagnets 36 are automatically energized and de-energized during each cycle as will be more fully described hereafter. In order to prevent a blank from being held on the feed bell by residual magnetism, means are provided to push or release the blank from the magnets of the feed bell. The releasing means includes a releasing cam 38 on the cam shaft 34.

The first element of the feeding mechanism, which as pointed out above serves for lifting a blank, swinging it onto a central portion of the table and placing it thereon, is shown more in detail in Fig. 11. It comprises a support 39 which is secured to the machine frame by a weld 40 (Fig. 1). A bearing bushing or sleeve 41 is secured in a vertical bore of the support 39. An outer sleeve 42 is rotatably arranged within the bearing bushing 41. The outer sleeve 42 may be rotated, more specifically, turned back and forth, by a gear segment 43 secured to its lower end by a set screw 44 and a key 44a. The gear segment 43 meshes with another gear segment 45 (Fig. 3), which latter forms the end of one arm of a bell crank lever 46 supported on a fulcrum pin 47. The other arm of the bell crank lever carries a roller 48 engaged in a cylindrical groove of the swing cam 33. From a consideration of Fig. 3 it can be clearly seen that during rotation of the swing cam 33 the gear segment 45 of the bell crank lever is turned or swung back and forth, causing a similar swinging movement of the outer sleeve 42. The thrust of the outer sleeve 42 and other parts connected thereto is taken up by a ball bearing 49 (Fig. 11) resting on a recessed portion of the upper end of the support 39. An outer casing 50 resting on the thrust bearing 49 is secured to the upper end of the outer sleeve 42 by means of a set screw 51. An inner sleeve 52 is slidably arranged within the outer sleeve 42 and forms a part of the means for lifting and lowering the feed bell 35. The lower end of the inner sleeve 52 projects beyond the lower end of the outer sleeve 42 and is provided with a grooved guide ring 53 securely fastened thereto. The lifting and lowering of the intermediate sleeve 52 is accomplished by the lifting and lowering cam 31, as best shown in Fig. 3, through a lever mechanism comprising a lever 54 which has one end guided in the cylindrical groove 55 of the cam 31, and another end held on a fulcrum 56. An intermediate point of the lever 54 is connected by a link 57 to the left-hand end of a lever 58 held on a fulcrum 59 and provided with a forked end or yoke 60 engaging the guide ring 53 through pins 61.

When during operation the lever 54 is forced down into one of the depressions 32 of the cylindrical groove 55 it effects downward movement of the link 57 and through the lever 58 upward movement of the intermediate sleeve 52. As the depression 32 passes the lever 54, the latter is moved upward and causes upward movement of the link 57 and downward movement of the intermediate sleeve 52. During a single revolution of the lifting and lowering cam, that is, during one cycle of the operation, the intermediate sleeve 52 is moved down and thereafter up while the feeding bell 35 is situated directly over the stack of blanks.

The inner sleeve 52 projects into a top portion 62 of the outer casing 50 (Fig. 11) where it is guided by a bushing 63 secured in a bore of said top portion 62. An intermediate portion of the inner sleeve is guided by a short bushing 63ª fastened to a recessed end portion of the outer sleeve 42. The bushings 63 and 63a hold the outer and inner sleeves in concentrically spaced relation to reduce friction between them during relative movement thereof. The feed bell 35 is pivotally connected to the ends of two levers 64 and 65. The latter are supported by pivots 66 and 67 respectively on side walls 68 of the outer casing 50. The right-hand ends of the levers 64 and 65 project into the casing 50 and are secured to the inner sleeve 52 through the intermediary of a square bushing 69 (Fig. 12). The levers 64 and 65 have forked ends or yokes 70 which engage side walls of the bushing 69 and are secured to said side walls and the inner sleeve 52 by means of screws 71 and buttons 71a. The inner sleeve 52 and the square bushing 69 have a recess 72 intermediate the connections between the levers 64 and 65 (Figs. 11 and 13).

As stated above, means are provided to release, strip or push a blank from the bell 35 against the residual magnetism of the lifting magnets 36. These means include a lever 73 which has an intermediate point secured by a pin 74 to the side walls 68 of the outer casing 50. A plate or ring 75 made of non-magnetic material and centrally disposed in the lower portion of the feed bell 35 is connected to the forked end or yoke (Fig. 11) of the lever 73 by means of two adjustable links 76. The right-hand end of the releasing lever 73 projects through the aforementioned slot 72 in the inner sleeve 52 into a recess 77 of a push or releasing rod 78 disposed within the inner sleeve. The push rod 78 is concentrically spaced in the inner sleeve and held in spaced relation by short guide bearings. One of them is shown with respect to the upper end. It comprises a short bushing 79 of suitable bearing metal secured to the inner surface of the inner sleeve 52. The lower end of the releasing rod 78 projects through a guide bushing 80 which latter is secured in the bore of an ear 81 of the machine frame. The releasing rod 78 is actuated by the releasing cam 38 through the intermediary of a lever 82 which latter is held on a fulcrum 83, as shown in the perspective view of Fig. 3. The left-hand end of the lever engages a cylindrical groove in the releasing cam which groove has two depressions 84 similar to the depressions 32 of the cam 31. The right-hand end of the releasing lever 82 has a forked portion or yoke 85 with pins 86 projecting into the groove of a grooved ring 87. The connection between the lever 82 and the push rod is similar to the one between the lever 58 and the inner sleeve 52.

During a complete revolution of the releasing cam the push rod is moved down and up twice. One such down and upward movement is necessary to push a blank from the magnets when the latter are located directly over the table and the other down and upward movement is necessary to permit down and upward movement of the bell when the latter is located over the stack of blanks. The down and upward movement of the inner sleeve 52 and the releasing or push rod 78 may be the same when a blank is picked from the stack of blanks, whereas the push rod 78 is moved up somewhat further than the inner sleeve 52 while the feed bell 35 delivers the blank to the table to cause the plate 75 within the bell 35 to push a blank away from the magnets. Thus, the arrangement may be such that no relative movement between the push rod and the inner sleeve takes place during the picking operation, whereas a relative movement takes place during the releasing operation.

A spiral spring 88 with a ring 89 thereon is provided on top of the grooved ring 87 on the push rod to act as a compensator during upward movement of the push rod 78. This is to enable a certain amount of resilience in the action of the stripping mechanism. To summarize the operation of the first element of the feeding mechanism, the swing cam 33 during a single revolution of the cam shaft 34 causes swinging movement of the feed bell 35 from the stack to the table and back to the stack. While the feed bell is located above the stack the lifting and lowering cam 31 causes through the lever mechanism 54, 57, 58, the inner sleeve 52 and the levers 64 and 65 downward movement of the bell and thereafter upward movement. At the same time the releasing cam 38 causes a similar movement of the releasing plate 75 through the lever 82, the releasing rod 78, the lever 73 and the links 76. Similar movements of the releasing plate 75 take place while the bell is swung onto the table to place the blank thereon with the difference, however, that the push rod together with the lever 73 is moved relatively to the inner sleeve and the levers 64 and 65 respectively to cause releasing of the blank from the feed bell 35.

The operation, particularly the cooperation of the different parts of the mechanism and their co-relation can be better understood from a consideration of the diagram in Fig. 18, showing one cycle of the operation of the different elements. The shaded area defined by the curves indicates the working strokes, that is, the strokes during which actual work is performed. The curve 90 illustrates the pick up operation. It begins at 90 degrees of the cycle and ends at 150 degrees. The actual picking or lifting of a blank takes place at the lowest point of the curve, that is, at about 115 degrees of the cycle. Thus, between 90 and 115 degrees of each cycle the feed bell is lowered onto the stack to receive a blank and between 115 and 150 degrees the feed bell with the blank is lifted from the stack of blanks. The curve 91, indicated below the curve 90, represents the movement of the releasing mechanism which is substantially the same as that of the lifting mechanism. In other words, during the picking these two mechanisms move in synchronism as pointed out above. Shortly after the termination of the picking-up operation, the feed bell is swung onto the table. The swing movement or stroke from the stack to the table is indicated by the curve 92. It begins at about 165 degrees of the cycle and ends at about 315 degrees. During this movement the blank moves in a horizontal plane. A few degrees of a cycle after the blank has been swung onto the table, in the present instance at about 320 dgrees, there begins the dropping and releasing operation, during which the blank is lowered onto the table. The lowering and raising movement is indicated by the curve 93. The releasing mechanism is simultaneously operated as indicated by the curve 94. As clearly shown, the height of the curve 94 is somewhat greater than that of the curve 93, causing a relative movement between the lowering and the releasing mechanism, more specifically between the feed bell 35 and the push plate 75, whereby the blank is pushed off the feed bell. After lowering and releasing a blank, the bell is lifted, reaching its upper level at about 360 degrees, whence a new cycle begins. The feed arm is swung back to the stack. Its movement, as indicated by the curve 95, begins at zero degrees and ends at about ninety degrees.

The curve 96 in the diagram of Fig. 18 illustrates the operation of the feed bell magnets which, as stated before, are automatically energized and deenergized. The energizing of the magnets is accomplished by the closing of an electric circuit and the de-energizing by the opening of this circuit. The magnets are energized between about 80 degrees and about 335 degrees of each cycle.

The arrangement for controlling the electric circuit for the feed bell magnets is indicated in Fig. 19. In the present instance the feed bell 35 has magnets, each of which has a coil 97. The coils of the six magnets are connected in series to a source of energy 98. The magnet circuit is automatically closed and opened by a cam 99 secured to the cam shaft 34, which cam actuates a contact making and breaking member 100. The cam 99 for closing and opening the circuit for the feed bell magnets and the contact making member 100 which includes a roller 100ª riding on the cam surface of the cam 99 are also shown in Figs. 1 and 3.

(b) *Stack raising mechanism*

The second mechanism 29 of the feeding mechanism as stated above, serves for supporting and gradually raising a stack of blanks so that the upper blank of the stack is always at a substantially definite level to be picked up by the feed bell. This mechanism which may be termed the stack raising mechanism comprises a frame 101 diagrammatically indicated in Fig. 3 and shown more in detail in Figs. 14 and 15. The frame 101 has a bottom plate 102 provided with a vertically disposed bushing 103 for guiding a feed screw 104. Provided between a shouldered portion 105 of the feed screw and the bottom 102 of the frame is a thrust bearing shown as an ordinary ball bearing 106 for taking up the thrust of the screw and other elements connected thereto. The feed screw 104 is surrounded by a spindle which comprises two halves 107 and 108 forming portions of a cylinder and being concentrically arranged with and spaced from the feed screw. The two halves 107 and 108, as clearly indicated in Fig. 16, are spaced apart to define vertical passages 109 and 110 between their adjacent edges. The lower ends of the two halves 107 and 108 are held in position by means of a ring 111 fastened to said halves by screws 112 (Figs. 3 and 15). The ring 111, as clearly indicated in Fig. 3, projects through openings 113 in side walls 114 of the frame 101. The upper ends of the two halves 107 and 108 are held apart by a cap 115 (Fig. 14), each half being secured to the cap by a screw 116. This cap has a central bore provided with a bushing 117 which forms a bearing for the upper end of the feed screw. The feed spindle comprising the halves 107 and 108 is provided with means for keeping the key notches of the blanks properly aligned. To this end one of the halves, in the present instance the half 108 (Fig. 16), has a key 118 fitting into the key notches of the blanks. The blanks are supported by a chuck 119 arranged to be gradually raised by the spindle and when reaching a certain level or upper end position to be dropped into a lower end position. The chuck comprises two halves 120 and 121. Each half has two side walls 122 and 123 held together in spaced relation at their base by a bracket 124, and in addition by an upper bracket 125 and an end plate 125ª suitably secured to the side plates. A releasing dog 126 is held between the side walls 122 and 123 of each half by a pivot 127. Pivotally connected to a downward projection of each dog is a jaw 128 comprising an outwardly projecting member 129 guided in inner recesses of the side plates 122 and 123, and a somewhat cylindrically shaped member 130 projecting through the slots 109 and 110 respectively of the spindle. The member 130 has an internal screw-threaded portion 131 fitting the thread of the feed spindle 104.

In Fig. 14 the chuck is shown in its upper end position in which a nose 132 of each dog is engaged by an adjustable screw 133 whereby the lower portions of the dogs are forced outward and effect disengagement of the threaded jaw portions 131 with the thread of the feed screw 104. The two halves of the chuck are united by a lower ring 134 secured to the lower brackets 124 and an upper ring 135 suitably secured to the upper brackets 125. From the drawings it will be readily seen that the rings 134 and 135 together with the inner portions of the brackets 124 and 125 are disposed within the annular space defined between the feed spindle and the feed screw. The arrangement is such that the rings 134 and 135 slidably engage the inner surface of the feed spindle halves 107 and 108. The threaded portions 131 of the two halves of the chucks during operation engage the feed spindle and the end pieces of the members 130 are guided between the brackets 125 when said members are moved radially outward, that is, released from their engagement with the feed screw.

The upper end of each dog has two depressions 136 adjacent each other. At one time a ball 137 is pressed into one of the depressions by the action of a compression spring 138 to keep the dog in a fixed position. The chuck has been shown in Fig. 14 with the threaded members 131 out of engagement with the feed screw. The disengaging, as stated above, is effected by the dogs 126 and the screws 133. As this upper end position is reached, the chuck drops instantly down into its lower end position to receive another stack of blanks. Means are provided at the lower end of the stack operating mechanism to absorb inertia or shock from the dropping chuck and to effect engagement between the chuck and the feed screw. The shock of the falling chuck is absorbed by leather cushions 139 which are flexibly mounted on the frame 101 by means including a bracket 140 on each side and bolts 141 and 142 with springs 143 and 144. The shock absorbers engage outer portions of the side walls 122 and 123 during the dropping of the chuck whereby the leather cushions 139 are forced outward and absorb the inertia of the dropping chuck.

The mechanism for effecting re-engagement of the chuck with the feed screw comprises two dog actuators 145 and 146, one for each half of the chuck. The lower ends of the dogs of the chuck are engaged by the dog actuators 145 and 146 when the chuck has been dropped into its lower end position. Each actuator is mounted on a carrier 147 slidably arranged in a slot 148 and forced radially inward by a compression spring 149. Secured to the lower side of each carrier is a roller 150, which latter engages a cam 151. The cam 151, is secured to the spindle and rotates slowly therewith. During rotation the cam forces the carriers 147 together with the actuators 146 slowly outward and also permits slow inward movement of the carriers and actuators whereby the latter cause inward movement of the lower ends of the dogs and gradually effect engagement between the threaded portions 131 of the chuck members 130 and the feed screw.

During each cycle of the operation of the machine the feed screw is turned a certain angle to lift the stack of blanks an amount equal to the thickness of a single blank. This is accomplished by means including a ratchet or ratchet wheel 152 secured to the lower end of the feed screw by a nut 153. The ratchet is turned by a pawl 154, which latter is secured to a disk 155 loosely arranged on the feed screw shaft intermediate the ratchet wheel 152 and the bottom 102 of the stack frame. The pawl 154 is actuated through a link 156 including an adjustment 157 and being connected by a pivot 158 to one end of a link 159 carrying a roller 160 which latter engages a cam 161. The roller 160 is secured to the link 159 by a pivot 162. The cam 161 which may also be in the form of an eccentric is secured to the lower end of the cam shaft 34. The ratchet wheel together with the feed spindle is prevented from turning backward while the pawl is moved out of engagement with the ratchet wheel by means of a one way lock latch 163, secured to the stack frame by a fulcrum 164 and held in engagement with the ratchet wheel by a compression spring 165 (Fig. 15). The link 159 carrying the roller 160 is connected at one end to a fulcrum 166, and the other end of said link is connected to a tension spring 167 for biasing the roller 160 against the eccentric or cam 161. During operation, rotation of the cam 161 causes turning movement of the link 159 about its fulcrum 166 (Fig. 3) whereby the link 156 with the pawl 154 is pushed towards the ratchet wheel and effects turning thereof. The link 159 is slotted at one end and provided with a pivot pin 158a to permit stroke adjustment of the ratchet. The amount of the turning movement may be varied by changing the adjustment 158a, depending upon the thickness of the individual blank. Thus, if under certain conditions the pawl moves the ratchet wheel one tooth during a single revolution of the eccentric 161, thereby raising the stack of blanks to maintain the upper disk at a definite level, the adjustment has to be varied thereafter to push the ratchet wheel two teeth ahead during a single revolution if blanks of twice the thickness than before are to be raised.

The blanks are supported on the stack-raising mechanism by a plate 168 having a layer or cover of felt 168a and being secured to the end plates 125a of the chuck. The provision of the felt cover 168a furnishes a measure of resilience and also facilitates the picking of the last blank. The picking of individual blanks is facilitated or, from another viewpoint, the picking of more than one blank from the stack is substantially prevented by the provision of stack-holding magnets 169 (Figs. 2 and 11). The pole shoes of the magnets have knurled surfaces 169a, as indicated in Fig. 2. In the present instance we have provided four stack-holding magnets. Pairs of magnets are secured to the ends of flat springs 169f, which latter are suitably supported at the upper ends of two holding rods 169b. The rods 169b have lower ends held on pivots 169c. Each magnet has an energizing coil 169d. The coils 169d are connected in series (Fig. 19) to the electric source or power line 98.

(c) *Gauging mechanism*

The gauging mechanism which, as stated above, forms the third element of the feeding mechanism serves for checking the operation of the feeding mechanism to insure that a single blank and not two or more blanks have been placed on the table. To this end means are provided for checking a condition, in the present instance the thickness of a blank or blanks placed on the table by the feeding mechanism. These means include a gauging spindle which is moved on the blank or blanks placed on the table, and means responsive to the movement of the gauging spindle for automatically disconnecting the electric circuit of the machine in response to an excessive thickness or like condition of the blank or blanks placed on the table.

The electric circuit (Fig. 19) includes a switch member 170 held closed by a relay 171. The relay has a magnet coil 172 connected to a battery or like source of electric energy 173. The coil circuit is closed by a photo-electric cell 174, which latter is exposed to a source of light 175. As long as the light from the source 175 strikes the photo-electric cell 174, the circuit for coil 172 is energized and the switch member 170 accordingly is held in closed position. Arranged intermediate the source of light 175 and the photo-electric cell 174 is a movable member or diaphragm 176 which is moved by a gauging spindle a distance depending upon the thickness of the blank or blanks placed on the table by the feeding mechanism. In case more than one blank is placed on the table or when a blank is faulty, that it, its thickness exceeds a certain value, the diaphragm 176 is moved sufficiently to interrupt the light radiated from the source 175 towards the cell. This causes automatically opening of the switch 170, thus interrupting the electric circuit and bringing the machine to a stop.

The mechanical construction of the gauging means, as shown in Fig. 3 and more in detail in Fig. 3a, comprises a cylinder or sleeve 177 for accommodating a gauging spindle 178. A nut or nuts 179 are screwed onto the upper end of the piston and bear against the end face of the cylinder 177. A compression spring 180 surrounds the lower end of the spindle and bears against the end face of the cylinder 177 and a gauging plate 181, forming a part of the spindle. The cylinder is rigidly secured to one end of a lever 182, whose other end is supported on a fulcrum 183. An intermediate portion of the lever 182 is pivoted to a roller 184, which latter bears against the cam surface of a gauging cam 185. The cam 185 is secured to the cam shaft 34. The roller 184 is held in engagement with the cam 185 by a compression spring 186. The diaphragm 176 is secured to the right-hand end of an arm 187. This arm projects through a longitudinal slot 188 (Fig. 3) of the lever 182 and is connected to the lever by a pivot 189 near the cylinder 177. The left-hand end of the arm 187 projects through a slot 190 of the cylinder (Fig. 3a) into a recess 191 of the spindle 178.

During operation, rotation of the gauging cam 185 effects downward turning movement of the lever 182 about its fulcrum 183 through the intermediary of the roller 184 which, as pointed out above, is pivoted to the lever and held in engagement with the gauging cam 185. The latter has two downwardly projecting lips 192 and 193 (Figs. 3 and 3a). Let us assume that a single blank of the desired thickness has been placed on the table. As the first downward projecting lip 192 of the cam 185 comes into engagement with the roller, the latter together with the lever 182 are forced downward a distance sufficient to bring the gauging plate 181 of the piston into engagement with the upper surface of the blank. During further rotation of the cam 185 the lip 193 comes into engagement with the roller 184, causing further downward turning movement of the lever 182. As the spindle 178 is prevented from further downward movement, it remains at rest but permits downward movement of the cylinder 177 under compression of the spring 180, thus effecting a relative movement between the cylinder and the spindle. This relative movement effects turning of the diaphragm arm 187 about its pivot 189. The left-hand end of the arm remains at rest whereas the right-hand end, that is, the diaphragm 176, is moved downward towards the path of the beam of light without interrupting the same. If, however, more than one blank or a faulty blank has been placed on the table, an increased relative movement between the gauging piston 178 and the cylinder 177 takes place, to the effect that the diaphragm 176 is moved into the path of light radiated from the source of light 175 towards the cell 174. The diaphragm thereby interrupts the beam of light, to the effect that the electric circuit is opened as described above.

2. LOCATING MECHANISM

Each blank placed on the table by the feeding mechanism has a central bore with a key notch. The locating mechanism comprises means for properly locating, centering or positioning the blank on the table so that its key notch is in a definite position with relation to the table. This mechanism comprises a centering member or plug 200 (Fig. 3) which has a lower cylindrically shaped portion 201 and an upper conically shaped portion 202 provided with a key 203 whose upper part is tapered. The plug 200 is normally disposed within an opening 204 (Figs. 2 and 2ª) in the machine table and is fastened to the upper end of a rod 205, which latter is guided in bearings 206 and 207 (Fig. 1) suitably secured to the machine frame. The locating plug 200 together with the rod is pressed in downward direction by a compression spring 208 surrounding an upper portion of the rod and disposed between a shoulder of the rod and a fixed guide member 209 forming a part of the machine table. The downward movement of the rod 205 by the action of the compression spring 208 is limited by a collar 210 secured to the rod above the lower guide bearing 206. Adjacent the lower end of the rod 205 is the right-hand end of a lever 211 which has an intermediate point supported by a fulcrum 212 and a left-hand end provided with a roller 213 engaging an upper portion of a cam 214 having a cam surface 215. Clockwise turning movement of the lever 211 which may be termed locating lever is limited by an abutment 218 (Fig. 1) secured to a post 219 on the machine frame. During operation, rotation of the cam 214 effects downward movement of the left-hand end of the locating lever 211 as soon as the roller 213 on the lever comes into engagement with the cam surface 215. This effects upward movement of the right-hand end of the locating lever 211 whereby the rod 205 is forced upward and the member 200 is moved out of the hole in the machine table into the bore of a blank placed on the table. It is important to note that the blank is placed on the table by the feeding mechanism substantially in the position desired. The locating mechanism may effect merely a slight turning movement of the blank in either direction to assure accurate positioning of the blank on the table. The conical portion 202 with the tapered portion of the key 203 of the locating plug 200 facilitates the positioning of the blank. The plug 200 is moved upward until the cylindrical portion 201 with the corresponding key portion 203 thereon projects into the bore and key notch of the blank to be located whereby the placing of the blank by the feed mechanism is corrected and the blank is fixed in its position.

The operation of the centering mechanism is shown in the diagram of Fig. 18 by a curve 220. The locating or centering member or plug 200 is moved upward, that is, above the table, at about 210 degrees of the indicated cycle and the plug 200 is moved down into the opening of the table at about 360 degrees, thus remaining above the table for approximately 150 degrees of the complete cycle.

In the preceding section it was pointed out that a blank is dropped onto the table under the action of the releasing mechanism at about 340° of the cycle. The locating plug is above the table while a blank is dropped thereon, so that the blank is located instantly. The action of locating, that is, the downward movement or dropping of the blank on the raised, locating plug, is facilitated by the conical shape of the plug and its key.

From a consideration of the curves 90, 91, 92, 96, and 220 in Fig. 18 it is apparent that the handling of an individual sheet by the feeding and locating mechanisms takes place during a single cycle of operations.

3. TRANSPORTING MECHANISM

The blank or blanks are placed on the right-hand portion of the table if viewed from the front of the machine (Fig. 1) by the feeding mechanism and located, positioned or centered by the locating mechanism. The punch mechanism is disposed on a central portion of the machine and includes a movable or rotatable table located adjacent the aforementioned stationary table 26. The blank has to be moved from the centered position on the stationary table onto the rotatable table of the punch mechanism. This action is accomplished by the transporting mechanism. The movement is effected by the cam 214 which also actuates the locating mechanism. The cam 214, which accordingly may be termed locating and transporting cam, has a cylindrical groove 225 for guiding a roller 226 secured to the end of a lever 227. The latter has a fulcrum 228 and is united with the end of an arm 229 forming a part of a segmental gear 230. The teeth of said gear mesh with the teeth of a longitudinal rack 231 suitably guided in grooves or recesses of the machine table. Rotation of the cam 214 causes up and downward movement of the lever 227 whereby the segment 230 swings back and forth and effects a corresponding reciprocating movement of the rack 231. Rigidly secured to the right-hand end of the rack 231 is a transporting magnet 232. The latter has a coil 233 and a core provided with legs 234. The legs are fastened to a strut 235 which in turn is secured to the longitudinal rack 231 by screws 236. The legs 234 have end portions or lips 237 sliding in longitudinal grooves 238 and 239 (Figs. 2 and 2a) in the machine table. In Figs. 1 and 2 and in the diagrammatic view of Fig. 3 the transporting mechanism is shown in the position in which a blank is being placed ready for the mechanism. From this position the magnet is moved to the right by the reciprocating movement of the rack 231 into a position for receiving another blank. The movement to the right-hand end position of the transporting magnet takes place while the swing arm of the feeding mechanism is swung from the stack towards the machine table. When the feed bell is swung onto the machine table the transporting magnet is in its right-hand end position, that is, to the right of the feed bell. In this position the lips 237 of the legs 234 of the magnet are disposed below the right-hand peripheral portion of the blank. After the blank has been correctly positioned by the locating mechanism the magnet 233 is energized to hold the blank in fixed relation on its lips. Thereafter the locating plug is withdrawn from its engagement with the blank and the transporting rack 231 is moved to the left into the position indicated in the drawings. The coil 233 of the transporting magnet is connected to the main line 98 (Fig. 19) through the intermediary of a switch member 240 which is automatically opened and closed by a cam 241 fastened to a cam shaft 242 to which shaft is also fastened the cam 214. The cam shaft 242 is suitably supported on the machine frame. During a single revolution of the cam 241 the circuit of the transporting magnet is closed and opened once.

The operation of the transporting mechanism in relation to the operations of the mechanisms above described is indicated in the diagram of Fig. 18 in which a curve 243 indicates the operation of the magnet and a curve 244 indicates the operation of the longitudinal table feed, that is, the reciprocating movement of the rack 231 and the corresponding movements of segment 230 and cam 214. As curve 243 shows, the magnet is energized from about 358 degrees to about 54 degrees and deenergized from 54 degrees to about 358 degrees. The feed stroke, that is, the movement of the magnet towards the punch mechanism, begins at zero and ends at about 48 degrees. At the end of the feed stroke the magnet remains at rest until about 152 degrees of the cycle, whence the return stroke begins, the magnet being returned into a position to receive another blank between about 152 degrees and 200 degrees of the cycle. As just pointed out, the feed stroke ends at about 48 degrees and the transporting magnet is deenergized at about 54 degrees, that is shortly after the termination of the feed stroke.

As stated before, the transporting mechanism moves a blank located on the right-hand portion of the table to the punch mechanism which is arranged on a central portion of the frame. From a broad viewpoint, the transporting mechanism represents a means for automatically feeding individual blanks to the punch mechanism. The latter, as will be more fully described in the following section, comprises a punch table which is continuously rotated. The transporting mechanism moves the blank into close proximity with the center of the rotating punch table so that the blank drops onto the rotating table as soon as the transporting magnet is deenergized. The locating of the blank onto the rotating table, more generally the engaging between the blank and the rotating table, is improved by the provision of push or hold-down buttons 245 and 246 (Fig. 3) secured to a frame 247 held on the lower end of a rod 248. The upper end of the rod is pivoted to a lever 249 having an intermediate point held on a fulcrum 250 (Fig. 1) and a left-hand end carrying a roller 251 bearing against a cam 252. The roller 251 is held in engagement with a lower cam surface of the cam 252 by a compression spring 253 (Fig. 1). The pins 245 and 246 are yieldingly supported on the frame 247 by the provision of springs 254 (Fig. 1). The lower cam surface of the cam 252 has a short notched portion 255. As soon as the roller 251 is permitted to drop into this notched portion, the push buttons 252 are forced downward by the action of the compression spring 253 to press the edge of a blank onto the stationary table. The magnetized lips at the opposite side of a blank accomplish the same effect, that is, to hold the blank stationary against rotation until a centering mandril, more fully described hereafter, is properly entered in the blank. The downward movement of the push buttons 254 begins at about 50 degrees, and their upward movement ends at about 65 degrees, as indicated by a curve 256 in Fig. 18.

The work stroke of the holding buttons lasts for a short period of time only. The buttons force the blank down into engagement with the upper surface of the fixed plate adjacent the edges of the rotating punch table. The buttons are removed as soon as the blank is engaged by the mandril and rotated therewith. A comparison between the curves 243 and 256 shows that the transporting magnet is deenergized immediately after the holding buttons have contacted with the blank.

It will be readily understood that the transporting of a blank to the punch mechanism and the pushing down of the blank by the push buttons takes place during a second cycle with respect to the handling of an individual blank by the machine as a whole. During the first cycle, as stated before, the blank is fed to the machine table and located thereon. During the second cycle the same blank is being transported to the punch mechanism and, as will be described in the succeeding sections, the blank is being punched during the second cycle and removed and discharged during a third cycle of operation. From this it will be seen that each blank is manipulated or handled by the machine during three successive cycles. From another viewpoint, this means that three different blanks are being manipulated during each cycle. One blank is fed and located while another blank is transported and punched and a third blank is removed and discharged.

4. PUNCH MECHANISM

The punch mechanism or punch press proper performs a plurality of consecutive punching, shearing, severing or deforming operations on each blank. In the present instance we have shown a punch mechanism for punching a plurality of uniformly spaced notches or openings into the periphery of an annular or circular disk or blank. The punch mechanism according to our invention comprises a flying punch and die, that is, a tool for carrying out the aforementioned operations of punching, shearing, severing or deforming. The term "flying" will best be understood by a brief consideration of the ordinary, known punch mechanisms.

In these ordinary mechanisms a blank, for instance, a disk, is placed on a table, which latter is rotated intermittently. During a certain rest period of the table, a reciprocating punch or male die performs a vertical stroke to punch the blank. The punch then is withdrawn, performing its upward stroke, and after the punch has cleared the blank, the latter is turned a certain predetermined angle into another position and while resting in this other position for a certain period of time the punch performs another punching or working stroke. Thus the blank performs an intermittent motion with a rest period of a certain length between consecutive movements. These rest periods limit to a considerable extent the possibility of reducing the time for punching the entire blank. In this kind of punch mechanism the female die, usually arranged below the blank to be punched, is fixed, remaining at rest.

According to our invention the blank is moved continuously.

In the case of an annular disk, such disk is rotated at a uniform speed. This is made possible by the provision of a punch and die which follow the movement of the blank while the punch acts upon or penetrates the blank. Thus the punch in the present arrangement performs not only a vertical downward and upward stroke but at the same time it performs an oscillating or backward and forward movement. This is accomplished by loosely supporting the punch on a crosshead, which latter is moved up and down by an eccentric, and by the provision of a guide or holder for the punch and a carriage for oscillating the punch guide together with the die in response to the angular speed of the rotating table supporting the blank.

The punch mechanism according to our invention, as best shown in Figs. 4 to 8 and Fig. 17 comprises a support 300 (Fig. 7) which forms a part of the frame and is disposed below the work table, and a casting 301 (Fig. 7) with lower flanges 302 secured to transverse recessed portions of the support 300 by means of bolts 303. The casting 301 may be moved in the grooves 302ª to permit adjustment in accordance with the diameter of the annular blanks to be punched. The support 300 has an axial bore 304 for guiding a rotatable mandril. The mandril serves for rotating the blank to be punched and for securely holding the blank during rotation. The mandril comprises a cup-shaped, outer sleeve 305 which has an upper portion 306 resting on a shoulder 307 of the support 300. A gear 308 is secured to the lower end of the cup-shaped sleeve 305 by means of a key 309 and a nut 310. A ring 311 is secured to the upper face of the upper portion 306 by means of screws 312. This ring 311 forms a support or table for a blank to be punched. A blank 313 is indicated in Fig. 7 on the rotatable table 311. The inner portion of the blank engages the table 311 and rotates therewith, whereas a circumferential portion of the blank slides on an annular portion 312ª (Fig. 7) of the stationary table 26.

As stated in the preceding section, the blank is transported to the punch mechanism by the transporting mechanism and held in position for a short time at the energized lips 237 of the transporting magnet and thereafter dropped onto the table by the action of the push buttons 245 and 246. The latter are withdrawn as soon as the blank engages the table 311 and rotates therewith. Means are provided for securely holding the blank on the rotatable table. These means comprise a holding plug and a key, connected to an actuating mechanism below the rotatable table, and a holding bell provided above said table.

The holding bell comprises a cup-shaped body 314 held on a vertical shaft 315 (Fig. 4) by means of a nut 316. The body has a rim 317. A holding ring 318 is flexibly supported on the rim 317 by the provision of four brackets 318ª projecting through openings 318ᶜ of the cup-shaped body.

The ring 318 is held by four bolts slidably arranged on the brackets, and forced downward by compression spring 318ᵇ. The shaft 315 is guided in vertical guide bearings 319 and 320, which latter are suitably supported on the machine frame. A grooved ring 321 (Figs. 1 and 3) is secured to the upper end of the shaft 315. The ring is engaged by pins 322 on a yoke 323 of a lever 324. An intermediate point of the latter is supported on a fulcrum 325 and the left-hand end of the lever carries a roller 326 which slides in a cylindrical groove 327 of a cam. As clearly shown in Fig. 1, the cam defining the cylindrical groove or cam surface 327 also forms the cam surfaces 241 and 255 heretofore described. During rotation of the cam (Fig. 1) the cam surface 327 causes during a certain period of a cycle the roller 326 to be moved upward whereby the lever 324 is turned clockwise and effects downward movement of the holding bell 314, whereby the ring 318 of the bell is forced against the blank to securely press the same against the rotating table. During rotation of the blank the bell 314 rotates with the blank. The rotary movement of the holding bell is facilitated by the provision of a thrust ball bearing 328 (Fig. 4) at the lower end of the shaft 315.

Relative rotary movement between the rotating table and the blank is prevented by the provision of a key or key member 329 (Figs. 7 and 8) engaging the key notch of the blank during rotation with the table. The key, as best shown in Fig. 8, has an intermediate portion 330 of prismatic shape and tapered end portions 331 and 332. The key is partly disposed in a plug 333 which has a conically shaped upper portion 334 with a slot 335, and a cylindrically shaped lower portion 336. Relative up or downward movement between the key and the plug 333 is prevented by a plate 337 secured to the top of the conically shaped portion 334. The intermediate portion 329 of the key has a central recess 338 (Fig. 7) for receiving a lever 339, which latter turns at an intermediate point about a pivot 342. The function of the lever will be described later. The end of the lever 339 is connected to the key by a pivot 340 projecting through a hole 341 in the intermediate portion 330 of the key. The plug 333 is disposed within a ring 350. The latter has two vertical recesses 351 and 352 arranged in alinement with the slot 335 of the tapered plug 333. The arrangement is such that the length of the base of the key is equal to the inner diameter of the ring 350 plus the radial depth of one of the recesses 351, 352. Means including the lever 339 are provided whereby either end 331 or 332 of the key is forced into one of the recesses 351 or 352.

The ring 350 is held in the cup-shaped portion 306 of the sleeve 305 and prevented from upward movement by the rotating table 311. As clearly shown in Fig. 7, the end face of the ring 350 abuts against the lower face of the table 311. The plug 333 for accommodating the key is secured to the upper end of an inner sleeve 353 by a pin 354. This inner sleeve 353 is slidably arranged within the bore of the outer sleeve 305. The latter has a recess 355 and bearing surfaces 356 and 357 for the inner sleeve. The recess 355 is provided to reduce friction during relative axial movements between the outer and inner sleeve. With this arrangement the inner sleeve may be moved up and down within the outer sleeve. Relative rotary movement between the two sleeves, however, is prevented by the provision of key means. These key means in the present instance are defined by two lips 358 and 359 on the bearing surfaces 356 and 357 of the outer sleeve. The lips project into a vertical groove 360 of the inner sleeve. A grooved ring 361 is secured to the lower end of the inner sleeve 353 by a pin 362 (Fig. 7). This grooved ring is engaged by pins 363 secured to a yoke 364 (Fig. 3) on the right-hand end of a lever 365. The latter has an intermediate point supported on a fulcrum 366 and carries at its left-hand end a roller 367 disposed within a groove 368 of a cam 369. The latter may be termed a punch-centering cam because it serves for raising and lowering the centering plug 333 with the key 329 for centering the blank on the rotatable table and holding it in fixed position during the punching operation. During operation, rotation of the punch-centering cam causes at a certain moment downward movement of the left-hand end of the lever 365 whereby the right-hand end thereof, that is, the yoke 364 with the pins 363, forces the ring 361 together with the inner sleeve 353 upward. This upward movement effects raising of the centering plug 333 with the key 329 until the lower end of the conical member 334 is disposed within the bore of the blank to be punched and one end 331 or 332 of the key is disposed within the key notch of such blank. If the key end 331 is disposed in the key notch of a blank, the other key end 332 is disposed in the slot 335 of the plug (Fig. 7).

The purpose of providing a key with two tapered ends 331 and 332 slidably arranged in the slot 335 and connecting the key to the lever 339 is as follows: Let us assume that a blank is being punched with the lower portion of the end 331 of the key disposed within the notch of the blank. A complete cycle of the operation of the machine lasts 360 degrees. The punching operation of a blank obviously lasts less than 360 degrees of a complete cycle because such complete cycle also includes the feeding of a blank to the punch mechanism and the withdrawal of the punched blank or work from the punch mechanism. The feeding and the withdrawal in the present arrangement take place simultaneously and the arrangement is such that the feeding and withdrawal of a blank lasts one-third of a complete cycle. Hence, the punching lasts two-thirds of a cycle. During the actual punching operation, the rotatable table performs a complete revolution so that the key is in the same position as it was when the actual punching operation started. The punching now sets out for one-third of the complete cycle, which is equal to one half of the actual punching cycle. The punch table or mandril, however, continues to rotate during this one-third of a complete cycle and at the end of this one-third of a complete cycle that is after the end of the blank transporting and withdrawal operation, the key is in a reversed position. The key end 331 which during the aforementioned cycle was located within the notch of a blank is now located diametrically opposite the key notch of a succeeding blank to be punched. The other end 332 is located on the same side. However, it does not project outwardly from the conically shaped plug 333 and is not located vertically below the key notch of a succeeding blank.

Means are provided for reversing or repositioning the key, sliding it through the slot 335 of the plug 333 so that with respect to the next blank the other end 332 may be used as a key for holding the blank in position on the rotating table.

From this viewpoint, the key 329 described above actually represents a double key with two key portions 331 and 332. Means are arranged whereby the key portion 331 is used for holding a blank and the key portion 332 is used for holding the succeeding blank. These means include the aforementioned lever 339 which may be termed a key-reversing lever. An abutment 370 is provided adjacent the lower spherically shaped end 371 of the lever 339. The abutment is adjustably secured to a link 372 (Fig. 3), which latter is fastened to a shaft 373 rotatably held on a fulcrum 374. A lever 375 has its right-hand end rigidly secured to the shaft 373 and its left-hand end provided with a roller 376 disposed adjacent a cam 377. The lever is normally pressed in downward direction by a tension spring 378 towards an abutment 379. The cam 377 has a lip 380 on its outer surface. During a complete revolution of the cam 377 the lip 380 as it comes into engagement with the roller 377 forces the left hand end of the lever 375 upward, effecting rotation of the shaft 373 whereby the link 372 with the abutment 370 is turned to the right and moves the lever 339 into the position indicated in Fig. 7. As the roller 376 passes the lip 380 on the cam 377, the lever 375 is returned into its original position toward the stop 379 by the action of the tension spring 378. Fig. 7 indicates the moment at which the abutment 370 has been moved to the right to throw over the lever 339, effecting reversing of the key position. The abutment 370 thereafter is moved away from the spherical lever portion 371. At the end of the actual punching, that is, after the blank has been rotated 360 degrees, the lever 339 with the ball 371 is again in the same position. The feeding of a blank to and the withdrawing of a punched or word blank from the punch mechanism takes place during another 180 degrees rotation of the rotating table, at the end of which the lever 339 with the ball 371 which rotate with the mandril are in reverse position so that not the key end 331 but the key end 332 will be located on the notched side of the succeeding blank. The use of the key end 332 which is located within the slot of the plug 333 is made possible by reversing the key, as described above. Assuming that in the aforementioned operation the key end 331 while underneath the table was positioned within the slot 351 of the ring 350, in the succeeding operation with the key reversed, the end 332 will be positioned within the recess 352 of the ring 350. The reversing operation of the key takes place during the transporting and withdrawal operation. The double key reversing arrangement permits the saving of time and may be provided whenever blanks are provided with an even number of notches.

The mechanism so far described includes a rotatable table for supporting and rotating a blank, a bell and a centering plug with a key for holding a blank securely on the rotating table. The holding bell is moved onto the table and returned once during a cycle and the centering plug with the key is raised above the table and lowered also once during a cycle. In addition, the key member which is in the form of a double key is reversed once during each cycle whereby the two ends of the key member are alternately used for holding successive blanks. The raising and lowering of the bell and the centering plug with the key, and the reversing of the latter is effected by three cams on the cam shaft 242.

The movement of the holding bell 314 is indicated by a curve 381 in the diagram of Fig. 18. The bell begins to move downward at about 54 degrees of a cycle and reaches its lower end position in which the flexibly supported holding ring 318 engages the blank at about 74 degrees of the cycle. The bell is raised, that is, moved out of engagement with the blank, at about 340 degrees of the cycle. As a comparison between the curves 381 and 256 indicates, the downward movement of the holding bell begins at the moment the hold-down or push buttons are removed from the bell. It is noted that these hold-down buttons hold down the blank for an instant only because the blank is then located on the rotating table and engaged by the centering plug with key. The raising and lowering of the double key together with the centering plug is indicated by a curve 382. Upward movement of the double key and the plug which form a part of the mandril begins at about 54 degrees, that is, simultaneously with the downward movement of the holding bell. The double key and the centering plug are lowered at about 340 degrees, reaching its lower dead-end position at about 360 degrees, that is, at the instant at which the holding bell reaches its upper end position.

The flying punching tool comprises a punch or male member 400 (Fig. 17) and a female member or die 401. The die is in the form of a rectangular plate which has an opening 402 in a central portion thereof for receiving a lower portion 402ᵃ (Fig. 4) of the male member 400. A rear portion of the die has a recess 403 and a plurality of bores 404 and a key notch 405. The lower surface of the plate is provided with another key notch 406 (Fig. 4). The female member, hereafter termed "die" is secured to an oscillating carriage 407. The latter, as clearly indicated in Fig. 17, is in the form of a rectangular frame which has a rear portion provided with ears 408 and a base portion 409 to which the die 401 is secured by means of screws 410. An opening 411 in the base portion 409 is in alinement with the opening 402 of the die and a notch 412 of the base portion is in alinement with the notch 406 in the die 401 (Fig. 4). Relative movement between the die 401 and the base 409 is prevented by a key 413 located in the notch 412 of the base and the notch 406 of the die. A guide 414 for the punch 400 is secured to the die 401 and the carriage 407. The guide 414 (Fig. 17) has a strut 415 provided with a projection 416 fitted into the recess 403 of the die. The screws 410 project through the ends of the strut 415 and thereby secure the guide to the die 401 and to the base 409 of the carriage 407.

The punch 400 has a sliding fit in a channel 416 of the guide 414. The punch 400 is held on a crosshead 417 by a dove-tail connection between a lower end 418 (Fig. 4) of the crosshead and an upper end 419 (Fig. 17) of the punch. The connection between the crosshead and the punch is such that the punch is prevented from moving up or down relatively to the crosshead but is permitted to move sidewise, more specifically to perform a swinging motion with respect to the crosshead about the center of the rotary punch table. As best shown in Fig. 4, the dovetail connection between the punch and the crosshead defines clearances 420 to permit such relative swinging or flying motion between the punch and the crosshead. The crosshead is movably arranged between guides 421ᵃ (Fig. 7) and supported through the intermediary of a bushing 421 on an eccentric 422 of a punch shaft 423. Rotation of the punch shaft 423 effects a reciprocating motion of the punch, that is, causes the punch to move up and down. The punch shaft 423 is driven through the intermediary of a universal coupling 424 from a drive shaft 425 (Fig. 4). The punch shaft is continuously operated, that is, while the actual punching takes place, which, as pointed out above, takes about two-thirds of a complete cycle as well as during the other third of this cycle while the punched blank is withdrawn from and a new blank is transported to the punch mechanism. This is made possible by the provision of means for lowering and raising the punch shaft so that with the lowered punch shaft the punch penetrates the blank and enters the die, whereas with the punch shaft raised, the punch merely reciprocates without reaching down to the blank and die. The means for lowering and raising the punch shaft once during a complete cycle comprises two eccentric sleeves or bushings 426 and 427, (Fig. 4), one on each side of the eccentric 422. The two ends of the punch shaft 423 are rotatably held in the eccentric sleeves 426 and 427 through the intermediary of bearing bushings 428 and 429 respectively. The eccentric bushings 426 and 427 are supported on bearings 430 and 431. A gear 432 is secured to the left-hand end of the eccentric bushing 426 and another gear 433 is secured to the right-hand end of the eccentric bushing 427. The gears 432 and 433 mesh with gears 434 and 435 respectively, which latter are held on a punch raising and lowering shaft 436. The shaft 436 is supported in bearings 437 and 438. These bearings are integrally formed with the aforementioned bearings 430 and 431 for the eccentric bushings 426 and 427 respectively. A gear segment 439 is secured to an intermediate portion of the punch raising and lowering shaft 436.

The gear segment 439 meshes with a gear segment 440. The segment 440 forms the right-hand end of an arm 441 (Figs. 1 and 3) which is connected to a fulcrum 442 and whose left-hand end carries a roller 443 sliding in a cylindrical groove 444 of a cam. This cam with respect to its function may be termed a "raising and lowering cam". During a complete rotation of the cam the roller 443 is raised and lowered once to effect lowering and raising respectively of the punch shaft. The punch shaft in Fig. 4 is indicated in its raised position. Rotation of the gear segment 439 by the action of the segment 440 and the raising and lowering cam effects rotation of the gears 434 and 435, resulting in turning movement of the gears 432 and 433. The latter thereby turn the eccentric bushings and thus lower the punch shaft 423.

The lowering and raising of the punch shaft 423 with respect to the drive shaft 425 is possible by the provision of the coupling 424. In the present instance this coupling has been indicated as a universal coupling known as a modified Oldham coupling. It comprises a plurality of disks 445 (Fig. 6). Each disk has a lip 446 projecting into a diametric recess 447 of an adjacent disk. This coupling permits driving of the punch shaft by the drive shaft while the axes of the two shafts are out of alinement.

The punch shaft effects reciprocating movement, that is, up and downward movement of the punch. The swinging or flying or oscillating movement of the punch is effected by the carriage 407 through the intermediary of the punch guide 414. The carriage 407 (Fig. 17) has a rectangular opening 450 which is centered on the mandril, more specifically the outer surface of the cup-shaped portion 306 (Fig. 7) through the intermediary of a square bushing 451 which has side walls engaging side walls 452 defining the opening 450 of the carriage. The bushing has a bore 453 forming a bearing surface for the cup-shaped portion 306 of the mandril. A cylindrical projection 454 of the bushing 451 is seated on an annular shoulder 455 of the base 300. The carriage is secured to the square bushing 451 by adjustable means comprising a bolt or screw 456 and nuts 457 and 458 (Figs. 4 and 17). This adjustment permits different punching operations for blanks of different diameters. The rear end of the carriage, that is, the ears 408, are connected to a mechanism for oscillating the carriage. The oscillating or swinging movement of the carriage is effected by an oscillating cam 460 which has a cylindrical, at least partly helically shaped, groove 461 and is secured to the drive shaft 425 (Fig. 4). Rotary movement of the cam is transmitted to the oscillating carriage by means comprising a roller 462 riding in the cam groove 461 (Fig. 5) and being secured to an arm 463 of a bell crank lever 464. The bell crank lever is connected to a fulcrum 465. Another arm 466 (Fig. 17) of the bell crank lever is adjustably secured to one end of a link 467 by means of a nut and a washer 468. The other end of the link 467 is secured to one end of an adjustable eye bolt 469 by a nut 470, and the other end of the eye bolt 469 is secured to the ears 408 of the carriage by a pin 471.

During operation, rotation of the oscillating cam 460 causes the bell crank lever 464 to swing about its fulcrum 465 (Fig. 5), resulting in oscillatory movement of the carriage and its square bushing about the cup-shaped portion 306 of the mandril. The carriage is continuously oscillated. The number of oscillations of the carriage is equal to the number of strokes of the punch. The speed of the oscillatory movement in at least one direction is equal to the speed of the rotary movement of the mandril so that no relative rotary movement takes place between the punch, the die and the rotating blank during the working stroke of the punch. This constant speed movement is accomplished by the helical shape of at least a portion of the groove 461 in the cam 460. After the working stroke, that is during the return stroke of the punch, the carriage is moved back into a new or original position. The speed of the backward movement is independent of the rotary speed of the table.

The punch mechanism also includes means for stripping the punch, more specifically the portion 402ª of the punch or punch proper which engages the blank to be punched. The stripping means comprises a stripper 480 (Figs. 4 and 17) which has a horizontal plate 481 disposed intermediate the lower face of the guide 414 and the blank to be punched. The plate 481 has an opening 482 fitting the punch to strip the blank from the punch during its return stroke as the punch has a tendency to stick to the blank. The plate 481 is integrally formed with an upright 483 (Fig. 17). The upright is disposed within a groove 484 of the punch guide 414. The upper end of the upright 483 (Fig. 17) is united with a U-shaped member 485 for supporting the stripper on a bar 486, which latter is secured on a lip 487 of a ring 488. The ring 488 is held on a recessed end portion of the eccentric bushing 427 (Fig. 4). The recessed end portion is concentric with the punch shaft. The arrangement is such that the stripper may be adjusted, that is, moved towards and from the lower face of the guide member 414. To this end the bar 486 is provided with a bore 489 for accommodating a worm 490 eccentrically secured to a pin 491. The pin 491 is secured to the lip 487 by a nut 492. The bar 486 has another bore 493 transverse to the bore 489 for accommodating an adjusting screw 494. For adjusting the stripper the nut 492 is loosened. Thereafter the screw 494 is turned to effect turning movement of the eccentric worm 490, whereby the stripper is moved in vertical direction. The adjustment is especially desirable where blanks of different thicknesses have to be punched.

The mechanism as shown in the drawings is adjustable to permit punching of blanks with different diameters. For punching a blank of a certain diameter, the punch is located at a certain radial distance from the center line of the mandril. In order to punch disks of greater diameter or, from another viewpoint, to punch holes into a blank at a greater radial distance from the center line of the mandril, the punch mechanism has to be moved to the right in the view of Fig. 4 and at the same time the adjustment of the carriage on the square bushing surrounding the mandril has to be changed. The movement of the punch mechanism to the right in Fig. 4 is facilitated by the provision of a special shaft 425. This shaft, as indicated in Fig. 4a, is splined comprising two halves 495 and 496, the half 495 of which has a projection 497 projecting into a diametrical slot 498 of the half 496, an arrangement known as "spline shaft". To permit a sufficient amount of transverse movement of the punch mechanism, the gear segment 440 (Fig. 2) is provided with wide face teeth, wider than the teeth of the segment 439 for raising and lowering the punch shaft. All that is necessary to adjust the punch mechanism in transverse direction is to loosen the bolts 456 for centering the carriage on the mandril, and the bolts 303 holding the casting 301 on the support 300 and to move the casting 301 along the grooves 302ª into the desired position and to retighten the bolts 303. To permit the relative movement of the casting 301 with respect to the stationary bolts 303, the base of the casting 301 has transverse slots 499, as indicated in Fig. 2.

The operation of the punch mechanism is indicated in the diagram of Fig. 18 by two curves 501 and 502. The curve 501 indicates the movement of the eccentric bushings 426 and 427 for lowering and raising the punch shaft 423. The lowering of the punch shaft, that is, the turning of the eccentric bushing begins at about 74 degrees and the bushing reaches its lower dead-end position at about 85 degrees. The bushing is raised at about 325 degrees, reaching its upper dead-end position at about 350 degrees. The curve 502 indicates the movement of the punch. It clearly shows that the punch is reciprocated continuously. The reciprocation takes place in two levels in accordance with the positioning of the eccentric bushing. The punch reaches its lower level at about 85 degrees, that is, simultaneously with the reaching of the lower dead-end position by the eccentric bushing and the punch is moved towards its upper level at about 325 degrees, reaching its upper level at about 350 degrees, that is, simultaneously with the reaching of the upper dead-end position by the eccentric bushing.

The relation between the reciprocating movement of the punch and the oscillatory movement of the punch and of the dies indicated in Fig. 20 by curves 504 and 505. The sinusoidal curve 504 illustrates the reciprocating movement of the punch, the double amplitude A representing the length of the punch stroke which may be in the order of one-fourth inch. The curve 505 represents the oscillatory motion of the punch and die, its double amplitude B being equal to the length of the oscillatory "stroke" which in the present example is less than the length of the reciprocating stroke.

It is important to note that the two curves 504 and 505 are displaced in phase. The phase angle, in the present example, is 100 degrees, that is, the punch reaches its upper dead-end 100 degrees prior to the reaching of a dead-end position by the carriage for oscillating the die. The punch enters the blank 50 degrees before reaching its lower dead-end position and leaves the blank 50 degrees beyond its lower dead-end position. The actual punching or deforming of the blank lasts 100 degrees of a punch cycle. During the punching the die moves in the direction of the blank rotation at the same speed at which the blank is rotated. The punch movement in horizontal direction must be the same as that of the die because the punch is guided horizontally by a guide fixed to the die carriage. Hence, no relative rotary or swinging movement takes place during the actual punching operation between the punch, the die and the blank. They are relatively at rest as regards their horizontal movements and from this viewpoint the above-mentioned punching period of 100 degrees may be termed a "moving rest period". Thus, the actual punching operation takes place during a period of relative rest in horizontal direction between the punch, the die and the blank.

The cylindrical groove 461 of the cam 460 for oscillating the die carriage as stated above, has at least a portion which is truly helically shaped to obtain constant speed of the carriage during the actual punching operation. As will be noticed, the curve 505 has a straight line portion E indicating constant speed during the actual punching period of 100 degrees of a punch cycle.

5. Mechanism for Removing the Completed Blank

The mechanism for removing the completed blank, that is, a work from the punch mechanism, more specifically from the table of the rotatable mandril, comprises means for picking up a work from the rotatable table and moving it towards the left-hand end of the stationary table. This means includes the aforementioned rack 231 for transporting a located blank to the punch mechanism. As stated in section 3, the transporting is effected by a magnet 232 which is secured to the right-hand end of the rack 231. The removing of a work is accomplished by means including a gripping device secured to an intermediate portion of the rack 231. The work stroke of the gripping device coincides with the work stroke of the transporting magnet 231, that is, while the transporting magnet is moved towards the rotating punch table, the gripping device is moved away from the rotating table.

The gripping device for removing a work from the rotating punch table, as best shown in Figs. 9 and 10, comprises a casing 510 which is provided with a bracket 511 rigidly secured to the rack 231 by means of bolts 512. The bracket 511 is disposed below the stationary table, and the casing 510 is located within a longitudinal opening or groove 513 (Figs. 2 and 2a) of the stationary table so that during reciprocating movement of the rack the casing 510 is reciprocated in the longitudinal opening 513. A front portion of the casing 510 forms a lower, fixed jaw 514. An upper jaw 515 is connected to the lower jaw by means of a pivot 516. A rear portion 517 of the upper jaw 515 is connected through a link 518 to a plunger or piston 519, which latter is slidably arranged in a channel 520 defined by the casing 510. The plunger 519 is pressed towards the right by a compression spring 521 disposed between the rear end of the plunger and a plug 522. The gripping device is indicated in Fig. 9 in closed position in which a punched blank 523 is held between the adjacent gripping surfaces of the jaws 514 and 515. It will be noted that the pivotal connection between the rear portion 517 of the upper jaw 515 and the link 518 is located above the center line of the compression spring. Means are provided for moving or forcing this pivotal connection below the dead center line of the compression spring to effect opening of the jaws. This means includes an operating member 524 which is integrally united with the upper jaw 515 and projects downwardly from the rear end of said upper jaw 515. By moving the downwardly projecting member 524 towards the right from the position indicated in Fig. 9, the upper jaw 515 is turned upward about its pivot 516, that is, the gripping device is opened. The pivotal connection between the rear portion 517 of the upper jaw and the link 518 thereby is moved downward below the center line of the compression spring, whereby the gripping device is securely held in open position by the action of the compression spring until it is forcibly closed by means acting upon the operating member 524, as will be described hereinafter.

Let us assume that the closed gripping device, as indicated in Fig. 9, is moved back towards the left-hand end of the machine table by the movement of the rack 231. Means are provided for effecting opening of the gripping device as the rack moves towards its left-hand end position. This means has been shown as comprising a stop 525 (Fig. 3) suitably supported below the rear end portion of the stationary table. At the end of the work stroke of the gripping device, that is, while the gripping device is moved away from the rotary punch table towards its left-hand end position, the stop 525 engages the member 524 and as the gripping device is moved a little further to the left causes the member together with the upper jaw to turn about the pivot 516, whereby the work 523 is released from the gripping device. Thereafter, the gripping device is moved back towards the rotary punch table for removing a succeeding work. The lower jaw in the right-hand end position is disposed below a peripheral portion of a blank being punched. Means are provided whereby the gripping device is closed before it is moved away from the rotary punch table. This means has to be arranged so that it does not effect closing while the gripping member is moved towards the punch table because the gripping device reaches the punch table before the blank has been completely punched. Thus, broadly speaking, the closing of the gripping device near the rotary punch table has to be effected by a closing means, causing closing of the gripping device at the beginning of or shortly prior to the work stroke, that is, before a work is removed, but preventing closing of the gripping device during the idle stroke, that is, while the gripping device is moved towards the rotary punch table. The closing means for the gripping device comprises a cam member 540 (Fig. 3) disposed below the stationary table on the right-hand side of the member 524 and in close proximity to the latter when the gripping device is in its right-hand end position near the rotating punch table. The cam member 540 is secured to a shaft 541 which latter is supported on a fulcrum 542. The shaft 541 is connected through a short crank 543 to one end of a connecting rod 544 whose other end is connected through a crank 545 to the lower end of a shaft 546 supported by a bearing 546a. Secured to the upper end of the shaft 546 is an arm 547 carrying a roller 548, which latter bears against a cam surface 549. The cam member 540 for effecting closing of the jaws of the gripping device is normally in the upright position indicated in Fig. 3. In this position it permits movement of the gripping member towards the rotating punch table without effecting closing of the jaws. Once during a cycle the roller 548 engaging the cam surface 549 is moved radially outward whereby the link 544 is moved towards the left and effects turning movement of the shaft 541 with the cam member 540. The outer portion of the cam member thereby is turned towards the left-hand end of the stationary table. This takes place after a blank has been punched. During this turning movement the cam member 540 comes into engagement with the right-hand side of the member 524 and thereby effects closing of the gripping device.

It will be readily understood that the closing of the gripping device by the cam member 540, as well as the opening of the gripping device by the stop 525, is at first opposed and thereafter aided by the compression spring 521 which tends to hold the jaws either closed or opened. The opening of the jaws is opposed by the compression spring 521 (Fig. 9) until the pivotal connection between the rear portion 517 and the link 518 has passed the center line of the compression spring, whereafter the latter aids in the further opening movement.

The operation of the work-removing mechanism is indicated in the diagram of Fig. 18 by two curves 555 and 556. The curve 555 indicates the closing and opening movement of the jaws of the gripping device. The jaws are closed at about 358 degrees and are opened at about 48 degrees, thus remaining closed during 50 degrees of a cycle. The withdrawl or removal of the notched blank or work takes place while the jaws are closed. The removal stroke begins at zero, that is, about 2 degrees after the gripping jaws have been closed, and the removal stroke ends at about 48 degrees. The return stroke of the gripping device, that is, the movement thereof towards the rotating work table begins at about 152 degrees and ends 48 degrees later, that is, at 200 degrees of each cycle. As the withdrawing of the work is effected simultaneously with the transporting of a blank to the rotating work table by the movement of the rack 231, the curve 556 must be symmetrical to the curve 244. The work stroke with respect to both operations, the transporting of a blank to the rotating work table and the removing of a punched blank therefrom, takes place during the first 48 degrees of each cycle.

6. Mechanism for Discharging Work from the Table

The mechanism for discharging a work from the table and stacking it on a spindle, as best shown in Fig. 3, comprises a fork 560 secured to an arm 561, which latter is held on a rack 562. The rack 562 is movable transverse to the stationary table and therefore may be termed a "transverse rack". The rack 562 meshes with a gear segment 563 which is formed at one end of an arm 564 whose other end is fulcrumed at 565 and rigidly connected to an arm 566 carrying on its end a roller 567. The roller 567 slides in a cylindrical groove 568 on the aforementioned cam 377. The arrangement in Fig. 3 has been shown in a position in which a work or completed blank has been moved to the left hand end of the table. Rotation of the cam 377 with the groove 568 then causes downward movement of the roller 567, effecting turning movement of the gear segment 563 from its rear end position towards the stationary table whereby the transverse rack 562 is moved towards the front of the table and causes the fork 560 to engage the rear edge of the sheet and move it across the table. The fork 560 has two prongs 569 and 570 which project into transverse grooves 571 and 572, (Figs. 2 and 2a). Secured to the front edge of the table is a slide 575 (Figs. 1 and 2) with an opening 576 and guides 577 and 578. The guides guide the work through the opening 576, whence it may be received by a magazine or transportable work spindle 579.

The operation of the discharge mechanism, that is, the movement of the fork 560, is illustrated by a curve 580 in the diagram of Fig. 18. The work stroke of the discharge fork begins at about 52 degrees of each cycle and ends at about 100 degrees of each cycle. The return stroke of the discharge prongs begins at about 100 degrees and ends at about 148 degrees of each cycle. A comparison between the curves 580 and 556 also shows that the operation of the discharge mechanism takes place while the removal mechanism is at rest with the gripping member positioned at the left-hand end of the table.

7. Power Agency

In the foregoing sections we have mentioned three shafts, 34, 242 and 425, and a mandril having a driven outer mandril sleeve 305 (Fig. 7). The shaft 34 drives the cams for actuating the feeding and locating mechanisms. The shaft 242 drives cams for actuating the transporting, punch, removing and discharge mechanisms. The shaft 425 drives a part of the punch mechanism, more specifically the punch shaft, and the cup-shaped sleeve 305 drives the rotary table. It will be readily understood that the shafts 34 and 242 must be rotated at the same speed, whereas the shaft 425 must be rotated at a considerably greater speed. A complete revolution of the shafts 34 and 242 corresponds to a complete cycle of the operation during which the punch has to perform a plurality of strokes, for example, 75 in case a blank has to be provided with 50 notches, openings or depressions during a period equal to two-thirds of a complete cycle. In this case the shaft 425 for driving the punch shaft 423 has to be rotated 75 times for a single rotation of the cam shafts 34 and 242. Hence, means have to be provided for driving shafts 242 and 34 at a ratio of 1 to 75 with respect to rotation of the shaft 425. The mandril sleeve 75

305 for rotating the rotary table must perform a complete revolution during the actual punching operation. With respect to the above example, where it is assumed that the punching operation lasts two-thirds of a complete cycle, the mandril sleeve 305 must perform a complete revolution during two-thirds of a cycle, that is, means must be provided for driving the cam shaft 242 and the mandril sleeve 305 at a speed ratio of 2/3 to 1 whereby the mandril sleeve performs a complete revolution during a turning movement of 240 angular degrees of the cam shaft 242.

The three shafts and the mandril sleeve are driven by an electric motor 585 (Fig. 19) which is connected to the line 98 through a switch 586. The motor 585 has a pulley 587 (Fig. 3) for driving a pulley 588 on the shaft 425 through a belt 589. As pointed out above, the shaft 425 is in the form of a spline-shaft having two parts 495 and 496 (Fig. 4a). The pulley 588 is secured to the part 496. A beveled gear 590 is secured to the rear end of the shaft 425, more specifically to the shaft part 496. The beveled gear 590 meshes with another beveled gear 591 which is secured to the upper end of a vertical shaft 592, the lower end of which carries another beveled gear 593 meshing with a beveled gear 594 secured to a horizontal shaft 595. A cylindrical gear 596 is secured to the shaft 595 and meshes with a gear 597 held on a shaft 598. A gear 599 is driven from the gear 597 and secured to a shaft extension of a worm gear 600 by means of a nut 600a (Fig. 2). The worm gear 600 meshes with the aforementioned gear 308 for driving the mandril sleeve 305 and also with a gear 601 secured to the cam shaft 242.

The gear mechanism so far described serves for driving the punch shaft, the rotating table and the cam shaft 242. A gear 602 is secured to the lower end of the cam shaft 242 and meshes with a reversing gear 603 held on a shaft 604 and engaging a drive gear 605 secured to the cam shaft 34. With this arrangement the cam shaft 34 is rotated in the same direction as the cam shaft 242.

The gear mechanism drives the various shafts at definite speed ratios whereby, for example, a definite number of notches or openings for instance 50 are punched during a complete cycle with the punching operation lasting two-thirds of the complete operating cycle.

The arrangement is such that by the exchange of a single gear a different number of notches or openings are punched during a complete punching cycle. As clearly indicated in Fig. 3, the shaft 598 for the gear 597 is held by an adjustable link 606 whereby the shaft 598 may be swung downward or upward about the shaft 595 for the gears 594 and 596. This permits the exchange of the gear 599 for a gear or gears with different radii having different numbers of teeth. In a preferred embodiment of the invention the arrangement is such that the number of teeth of the gear 599 for driving the worm 600 is equal to the number of notches, depressions or openings to be punched, that is, in the case where a blank has to be provided with 50 notches we provide a gear 599 with 50 teeth. If thereafter a similar blank has to be provided with 60 similar notches, openings or depressions, all that is necessary is to exchange the gear 599 for another gear with 60 teeth. This is accomplished by unscrewing the nut 600a for the gear 599, removing the gear 599 from the shaft extension of the worm 600 and swinging the gear 597 with the arm 606 downward about the shaft 595. Another gear 599 is then secured to the shaft extension of the worm and the gear 597 is swung back to mesh with the new gear 599.

SUMMARY

The punch press as described above is entirely automatic in its operation. The attendant places from time to time a new stack of blanks on the stack raising mechanism, removes the punched stacks of blanks, and in case the machine is stopped by the supply of a faulty blank or a plurality of blanks to the stationary table the attendant removes such faulty blank or plurality of blanks. If the machine is set up for operation, it is adapted to automatically perform a plurality of consecutive, that is, a succession of punching operations in predetermined spaced relation on a blank or blanks. The setting up of the machine involves the provision of the proper plugs and keys for locating the blanks on the stationary table and for centering and holding the blanks on the rotating table. The setting up also includes the transverse adjustment of the reciprocating punch on the stationary table to fix its distance from the center of the rotatable table, the centering of the oscillating carriage on the rotatable table and the provision of a gear with a predetermined number of teeth for driving the worm, that is, for fixing the speed ratio between the rotating table, the cam shaft or shafts and the drive shaft for the punch.

During operation, each mechanism or means moves or operates in a definite relation to the movement or the operation of another mechanism or means of the machine. This is accomplished by the provision of shafts or shaft means for rotating cams or cam means to actuate the different mechanisms. These shaft means are interconnected by torque transmitting means, in the above example by gears or gearings.

The operation of the machine as a whole is briefly as follows: The feeding mechanism, which includes a swing arm and cams on the shaft means, automatically picks up within fixed intervals individual blanks from the stack raising mechanism and places them on the stationary table. Simultaneously the stack of blanks on the stack raising mechanism is automatically raised to maintain the top of the stack of blanks, that is, the upper blank, at a substantially fixed level. After a blank has been placed onto the stationary table by the feeding mechanism, a locating or centering plug which is actuated by a cam on the shaft means is raised above the level of the stationary table to project into a notched opening of the blank and thereby position the blank. Thereafter the centering plug is retracted into an opening of the stationary table, leaving the blank free to slide. The blank is held against rotational movement by the transporting magnet which forms a part of the transporting mechanism. The transporting mechanism which is actuated by cam means on the shaft means transports the blank onto the rotating table or mandril. The blank is pushed down onto the rotating table by push buttons which are actuated by a cam on the shaft means. Thereafter the push buttons are withdrawn and the transporting magnet demagnetized. The blank is secured to the rotatable table to prevent relative movement between the table and the blank during the punching operation by means of a centering plug with a reversing key and a rotatable holding bell. Both centering plug and holding bell are actuated by cams on the shaft means. The punch mechanism then proceeds to operate, lowering the continuously reciprocating punch down to the proper punching level. The punch reciprocates in this level until a predetermined number of punching operations has been performed, in the case of the manufacture of laminations until a predetermined number of uniformly spaced notches or openings have been punched on an annular portion of a blank. The punch is then automatically raised to continue its reciprocating movement at a higher level, rendering the movements ineffective as regards the punching of a blank. The centering plug with its reversible key starts to descend below the level of the rotatable table and the holding bell is moved away from the rotatable table. Gripping jaws of the blank removing mechanism close tight onto the blank and the removing mechanism removes the punched blank from the rotatable table to the stationary table. This removing operation takes place simultaneously with the transporting or feeding operation of another blank to the rotatable table. The removing mechanism completes its stroke, at the end of which the gripping jaws are automatically opened, leaving the blank free on the stationary table. The discharge mechanism which includes stacking prongs now comes into operation, sweeping the punched blank through the spindle guides onto a receiving or stacking spindle or tote box.

The short stroke of the punch, the movement of the oscillating carriage, the light weight of these parts, absolutely controlled motions, accurately generated type hardened and ground gearing, high speed cam grooves on hardened and ground cams result in accurate work at very high speed with nominal maintenance. We have found that with our improved punch press no difficulty has been experienced in the performing of a number of punching operations in the order of 2000 per minute.

To review some important features of the punch mechanism, the punch is connected to a cross-head which includes a small square block mounted on an eccentric integrally formed with the punch shaft. The length of the stroke of the punch is determined by the throw of the eccentric which may be very small, for instance in the order of one eighth of an inch. The cross-head assembly is light in weight which is a distinct advantage in such mechanisms. The weight of the cross-head assembly may be in the order of six pounds. The punch shaft for reciprocating the cross-head with the punch is raised and lowered, that is, retracted from and moved towards the rotatable or movable table by a mechanism including eccentric bushings for supporting the punch shaft on each side of its eccentric. The eccentric bushings are revolved preferably through 180° in raising and lowering the punch shaft to prevent engagement between the punch and a blank on the table. The eccentric bushings in their down position, that is, during punching operation, are in their lower dead center and take the reaction from the punching operation without vibration. Also, when the eccentric bushings are in their upper dead center they take the reaction from high speed reversals of the cross-head without the vibration. The punch shaft is driven by a motor-driven drive shaft through the intermediary of a universal coupling, permitting the punch shaft to be moved in and out of alinement with the drive shaft. The rotatable or movable table for supporting a blank while being punched is continuously rotated at uniform speed. The blank is secured to the rotatable table during the punching operation. To prevent relative rotary movement between the punch and the rotating table during the actual punching operation, that is, while the punch engages the blank to be punched, a carriage is provided for oscillating the punch as well as the die. The oscillatory movement is timed with respect to the reciprocating movement of the punch by means of an oscillating cam rotated in a definite relation to the reciprocating movement of the punch.

What we claim as new and desire to secure by Letters Patent of the United States, is:

1. In an indexing punch press, the combination of a stationary table, means for feeding a blank to the table, means for checking the blank on the table and preventing operation of the press in response to a condition of the blank, means for locating the blank on the table, a movable punch table, means for moving the punch table at uniform speed, means for transporting the located blank to the punch table, means including a flying tool for punching the blank on the moving punch table, means for removing the punched blank from the moving punch table to the stationary table, and means for discharging the punched blank from the stationary table.

2. In an indexing punch press, the combination of means for supporting a blank, means for automatically feeding a blank to the supporting means, means for automatically checking the blank and interrupting operation of the machine in response to a condition of the blank, means for automatically positioning the blank on the supporting means, means including an electro-magnet for transporting the blank, a movable table arranged to receive the blank from the transporting means, means for moving the table at uniform speed, means including a flying punch for punching the blank on the movable table, and means for automatically moving the punched blank from the movable table and discharging it from the machine.

3. In an indexing punch press, the combination of a movable table, means for continuously moving the table at uniform speed. means for automatically transporting a blank to the table, means for automatically punching the blank on the table comprising a punch and a mechanism for reciprocating and oscillating the punch, and means for automatically removing the punched blank from the table.

4. In an indexing punch press, the combination of a stationary table having a central portion defining an opening, a rotatable table having a supporting surface within said opening, a power agency for rotating the rotatable table, a feed mechanism for automatically feeding a blank to one end of the stationary table and including means for checking the blank on the stationary table and interrupting operation of the machine in response to a condition of the blank, a locating mechanism for automatically positioning the blank on the stationary table, a transporting mechanism for transporting the positioned blank to the rotatable table, a flying punch mechanism for automatically punching the blank on the rotatable table, a removing mechanism for automatically removing the punched blank from the rotatable table to another end of the stationary table, and a discharge mechanism for automatically discharging the punched blank from the stationary table.

5. In an indexing punch press, the combination of a stationary table; a feeding mechanism for feeding a blank to the stationary table comprising means for automatically raising a stack of blanks, means for picking a blank from the stack and placing it onto the table, and means for checking the blank on the table; a locating mechanism comprising a plug normally disposed in an opening in the table, and means for raising and lowering the plug to automatically position the blank on the table; a transporting mechanism for transporting the positioned blank comprising an electromagnet, means for automatically energizing and deenergizing the magnet, and means for reciprocating the magnet; a rotatable table for receiving the blank from the transporting mechanism; a drive mechanism for rotating the table at uniform speed; a punch mechanism including the rotatable table, a punch, a die for the punch, means for reciprocating the punch and oscillating the punch and the die for punching the blank on the rotatable table, and means for automatically raising and lowering the reciprocating means, a removing mechanism for automatically removing the punched blank from the rotatable table comprising a gripping device, means for reciprocating the gripping device, and means for automatically closing the gripping device in one end position and opening it in another end position; and a discharge mechanism for automatically discharging the removed blank comprising a fork, and means for reciprocating the fork.

6. In an indexing punch press, the combination of a rotatable table for supporting a blank, means for rotating the table at uniform speed, a punch for punching a blank on the table, means for continuously reciprocating the punch, a die in cooperative relation with the punch, means for oscillating the die and the punch, means for automatically raising the punch reciprocating means after a predetermined angular movement of the rotatable table, means for automatically transporting a blank to the rotatable table, means for lowering the punch reciprocating means for causing the punch to perform a plurality of consecutive, spaced punching operations on the blank, and means for automatically withdrawing a punched blank from the rotatable table.

7. In a feeding mechanism for moving blanks from a stack of blanks to a table, the combination of a support for the stack of blanks, means including a vertically disposed feed screw connected to the support for automatically raising the support to maintain the top of the stack at a substantially fixed level, a rotatable arm, means comprising a shaft in parallel relation to the feed screw for swinging the arm in a horizontal plane, a feed bell supported on the arm, and means for automatically raising and lowering the bell when swung over the stack.

8. In a feeding mechanism for moving blanks from a stack of blanks, a stack raising mechanism including a vertically disposed feed screw for automatically raising a stack of blanks so as to maintain the top of the stack at a substantially fixed level, a swing arm, means including a vertical shaft for horizontally swinging the arm onto the stack in response to movement of the stack raising mechanism, a lever having an intermediate point pivotally connected to the swinging arm, a bell connected to one end of the lever, and means including another shaft concentrically arranged with the vertical shaft and connected to the other end of the lever for automatically effecting lowering and raising of the bell while the bell is disposed above the stack.

9. In a feeding mechanism for moving a blank from one position into another position, a swing arm, a cam shaft, means for rotating the cam shaft, means including a cam on the shaft for oscillating the swing arm between two fixed end positions, a lever having an intermediate point pivoted to the swing arm, an electromagnet on one end of the lever, means including another cam on the shaft for automatically energizing and deenergizing the electromagnet, a lowering and raising cam on the shaft, and means actuated by the lowering and raising cam and connected to the other end of the lever for automatically lowering and raising the electromagnet in the end positions of the swing arm.

10. In a feeding mechanism for moving blanks from one fixed position into another fixed position, a swing arm, a cam shaft, means including a swing cam on the cam shaft for oscillating the arm between two fixed end positions, a lever having an intermediate point pivoted to the arm, electromagnetic means connected to one end of the lever, means including a cam on the shaft, and a source of energy for automatically energizing and deenergizing the electromagnet, means connected to the other end of the lever and including a lowering and raising cam on the shaft for automatically lowering and raising the electromagnet in the end positions of the swing arm, another lever with an intermediate point pivotally connected to the swing arm, a releasing member adjacent the electromagnet and connected to one end of the other lever, and means connected to the other end of the other lever and including a cam on the shaft for automatically pushing a blank from the magnet in one end position of the swing arm.

11. In a stack raising mechanism for raising a stack of blanks, a screw, means for driving the screw, a chuck having screw-threaded members normally engaging the screw, means for preventing rotary movement of the chuck to effect raising of the chuck in response to rotary movement of the screw, a table secured to the chuck for supporting the stack of blanks, and means including a dog pivotally connected to the threaded members of the chuck for automatically effecting disengagement between the chuck and the screw in an upper end position of the chuck.

12. In a stack raising mechanism for raising a stack of blanks, a screw, means for driving the screw, a chuck having screw-threaded members normally engaging the screw, means for preventing rotary movement of the chuck to effect raising of the chuck in response to rotary movement of the screw, a table secured to the chuck for supporting the stack of blanks, means including a dog pivotally connected to the threaded members of the chuck for automatically effecting disengagement between the chuck and the screw in an upper end position of the chuck and permitting the chuck with the supporting table to drop into a lower end position, and shock-absorbing means engaging the dropping chuck before it reaches the lower end positon.

13. In a stack raising mechanism for raising a stack of blanks, a screw, means for driving the screw, a chuck having screw-threaded members normally engaging the screw, means for preventing rotary movement of the chuck to effect raising of the chuck in response to rotary movement of the screw, a table secured to the chuck for supporting the stack of blanks, means including a dog pivotally connected to the threaded members of the chuck for automatically effecting disengagement between the chuck and the screw in an upper end position of the chuck to permit the chuck with the supporting table to drop into a lower end position, shock-absorbing means engaging the dropping chuck near its lower end position, and means for automatically effecting re-engagement between the threaded members of the chuck, the last named means comprising yieldably supported members engaging said dogs in the lower end position of the chuck.

14. In a stack raising mechanism, a vertically arranged screw, means for driving the screw, a chuck having a threaded member engaging the screw, means for preventing the chuck from rotary movement, a table for a stack of blanks secured to the chuck, means for disengaging the threaded member from the screw in an upper end position of the chuck, means for guiding the dropping chuck to a lower end position, and means for effecting re-engagement between the chuck and the screw in the lower end position comprising a cam secured to the screw, a member guided by the cam and engaging said dog.

15. In a stack raising mechanism for raising a stack of blanks having openings, a table for supporting the blanks, a fixed vertically disposed spindle projecting through an opening in the table and openings in the blanks, a feed screw arranged concentrically within the spindle, means for rotating the screw, means for supporting the table on the screw comprising a chuck having a portion fastened to the table and a threaded member projecting through a vertical slot in the spindle and engaging the screw, means for disengaging the threaded member from the screw in an upper position of the chuck to cause the chuck to drop into a lower position, and means for re-engaging the threaded member with the screw in said lower position comprising a cam secured to the screw, and a member engaging the chuck and guided by the cam.

16. In an indexing punch press for automatically punching blanks having central openings, the combination of a punch mechanism, and means for automatically feeding at determined intervals a blank to the punch mechanism comprising a stack raising mechanism for maintaining the top of a stack of blanks at a substantially fixed level, the stack raising mechanism including a frame with a hollow vertically disposed spindle, a screw centrally disposed within the spindle, means for driving the screw in response to the operation of the punch mechanism, a chuck including rings guided on the inner surface of the spindle, side plates external the spindle and brackets projecting through vertical slots in the spindle for securing the side plates to the rings, a screw-threaded member engaging the spindle and guided between the brackets and a dog fulcrumed to the side plates and pivotally connected to the screw-threaded member for effecting disengagement of the threaded member and the screw in an upper end position of the chuck whereby the chuck is permitted to drop into a lower end position, means actuated in response to movement of the screw and engaging said dog for effecting re-engagement between the screw-threaded member of the chuck and the screw in the lower end position of the chuck.

17. In an indexing punch press for automatically punching a plurality of blanks, the combination of a punch mechanism for performing a plurality of consecutive punching operations in spaced relation on a blank, means co-operating with the punch mechanism for automatically feeding a blank to the punch mechanism and simultaneously withdrawing a punched blank therefrom comprising a stack raising mechanism for raising a stack of blanks to maintain the top thereof at a substantially fixed level, said stack raising mechanism including a screw, means in cooperative relation with the punch mechanism for driving the screw, a chuck with a table for supporting the stack of blanks having a threaded member engaging the screw, means for automatically effecting disengagement between the threaded member and the screw in an upper end position of the chuck to cause dropping of the chuck into a lower end position, and means including a cam on the screw for causing the threaded member to re-engage the screw in the lower end position of the chuck.

18. In a punch press, the combination of an electric power circuit for the press including a relay, means including a photo-electric cell and a source of light for holding the relay in closed position, a table, means for placing at predetermined intervals a blank on the table, and a mechanism for automatically checking the blank on the table and interrupting operation of the machine if the thickness of the blank exceeds a predetermined value, said mechanism comprising a gauging spindle, a diaphragm connected to the gauging spindle, means including a fulcrumed lever for supporting the gauging spindle and means acting upon the lever for moving the gauging spindle to contact the blank, the arrangement being such that the diaphragm interrupts the beam of light radiated from said source of light towards the photo-electric cell in response to an excess thickness of the blank.

19. In a punch press, the combination of a table, a punch mechanism supported by the table, an electric motor for driving the mechanism, an electric circuit for the motor, means for maintaining the circuit normally closed, said means including a relay, a photo-electric cell and a source of light, means energized from the circuit for feeding blanks from a stack of blanks to the table, and means for automatically gauging the blanks on the table and interrupting the circuit in response to an excess thickness of the blanks, said gauging means comprising a gauging spindle, a diaphragm connected to the gauging spindle and means for automatically moving the gauging spindle to contact the blanks on the table, the arrangement being such that a beam of light radiated from the source of light to the photo-electric cell is interrupted in response to an excess thickness of a blank.

20. In a punch press, the combination of a stationary table, a punch mechanism secured to the table, an electric motor for driving the mechanism, an electric power circuit for the motor, means including a photo-electric cell and a source of light for radiating a beam of light onto the cell to normally maintain the circuit closed, a diaphragm adapted to interrupt the beam of light to cause opening of the circuit, a mechanism for automatically moving a blank on the table, and gauging means for automatically gauging a condition of the blank, the gauging means being connected to the diaphragm and arranged to move the diaphragm into the path of said beam of light in response to a faulty condition of the blank.

21. In a punch press, the combination of a stationary table, a punch mechanism secured to the table, shaft means, cam means secured to the shaft means for actuating the punch mechanism, a stack raising mechanism in fixed relation to the table, means including a cam on the shaft means for driving the stack raising mechanism to maintain the top of a stack of blanks at a substantially fixed level, means including cam means on the shaft means and a swing arm for picking up a blank from the stack raising mechanism and moving it onto the table, and means including a cam on the shaft means for automatically gauging the thickness of the blank on the table and rendering the press inoperative in response to an excess thickness of the blank.

22. In a punch press, the combination of a stationary table, a feeding mechanism for automatically moving a blank on the table, a locating mechanism for positioning the blank on the table, comprising a plug with a key having a conically shaped portion and being normally disposed in an opening of the table, and means cooperating with the feeding mechanism for automatically raising and lowering the plug, said plug fitting into a notched opening of the blank and effecting positioning of the blank while being raised.

23. In a punch press, the combination of a stationary table, a punch mechanism supported on the stationary table, means for automatically supplying blanks to be punched to the punch mechanism comprising shaft means, a feeding mechanism including cam means on the shaft means for automatically moving a blank on the table, a locating mechanism for positioning the blank on the table including a plug with a key normally disposed within an opening of the table, means including a cam on the shaft means for automatically raising the plug with the key to project into a notched opening of the blank, and a transporting mechanism including a transporting cam on the shaft means for transporting the positioned blank to the punch mechanism.

24. In a punch press, the combination of a table, a punch mechanism secured to the table, means for automatically moving a blank from a stack of blanks to the table, and means for automatically moving the blank from the table to the punch mechanism comprising a rack disposed below the table, means for reciprocating the rack, a transporting magnet secured to the rack and having a leg disposed in a slot in the table for holding the blank.

25. In an indexing punch press, the combination of a stationary table, a stack raising mechanism secured to the table for maintaining the top of a stack of blanks at a substantially constant level, means for automatically feeding a blank from the stack of blanks to the table, a punch mechanism secured to the table, and a transporting mechanism for removing the blank from the table to the punch mechanism comprising a transporting magnet having legs disposed in slots of the table and adapted to securely hold a blank, a transporting cam, means for rotating the transporting cam, means engaging the cam and being connected to the transporting magnet for reciprocating the magnet, and means for automatically energizing the magnet in one end position and deenergizing the magnet in another end position.

26. In a punch press, the combination of a table, a punch mechanism secured to the table, and feeding and removing means for automatically feeding within fixed intervals a blank to the punch mechanism and removing a punched blank, said removing means comprising a rack disposed below the table, means for reciprocating the rack, a gripping device secured to the rack and disposed in a slot of the table, and means for automatically effecting closing and opening of the gripping device.

27. In an indexing punch press, the combination of a stationary table, a punch mechanism including a rotatable table disposed in an opening of the stationary table, means for punching a blank on the rotatable table during rotation thereof, and a removing mechanism for removing the punch blank from the rotatable table, said removing mechanism comprising a gripping device disposed in a slot of the stationary table, means for reciprocating the gripping device in said slot between two fixed end positions, and means for automatically effecting closing of the gripping device in one end position to hold the blank and opening of the gripping device in another end position to release the blank.

28. In a punch press, the combination of a stationary table, a rotatable table adjacent the stationary table, means for continuously rotating the rotatable table, means for automatically punching a blank placed on the rotatable table, a removing mechanism for automatically removing the punched blank from the rotatable table to the stationary table, and means for automatically discharging the punched blank from the stationary table comprising a transverse rack, means for automatically reciprocating the rack and a fork secured to the rack and having prongs projecting into transverse slots in the stationary table.

29. In a punch press, the combination of a punch mechanism including a rotatable table, a stationary table adjacent the rotatable table, means including a gripping device for automatically removing a punched blank from said rotatable table onto the stationary table, and other means cooperatively associated with the first named means for automatically discharging a removed blank from the stationary table.

30. In an indexing punch press, the combination of a movable table, means for continuously moving the table at uniform speed, and a punch mechanism for simultaneously performing a plurality of consecutive punching operations in fixed spaced relation on a blank held on and movable with the table.

31. In an indexing punch press, the combination of a movable table, means for continuously moving the table at uniform speed, means for holding a blank to be punched on the movable table, and means for performing a plurality of consecutive punching operations in fixed spaced relation on the blank, said holding means preventing relative movement between the blank and the table during the punching operation.

32. In an indexing punch press, a rotatable table, means for rotating the table at uniform speed, means for securing a blank to the table to prevent relative movement between the table and the blank during the punching operation, said means comprising a holding bell disposed above the table, means for automatically lowering the bell to press the blank against the table during the punching operation, means for automatically raising the bell after the punching operation to permit removal of the punched blank, and means in cooperative relation to the lowering and raising means for punching the blank while the bell is lowered.

33. In an indexing punch press, the combination of a rotatable table for supporting and rotating a blank to be punched, means for rotating the table at uniform speed, a punch mechanism including a flying punch for performing a plurality of consecutive punching operations in fixed spaced relation on the blank, and means for holding the blank on the table during the punching operation to prevent relative movement between the blank and the rotating table, said holding means comprising a holding bell having a rim and a ring yieldingly supported on the rim, means for supporting the holding bell and permitting rotation thereof and means for lowering the holding bell to press the blank against the table.

34. In an indexing punch press, a movable table for supporting a blank to be punched, means for continuously moving the table at uniform speed, and a punch mechanism for performing a plurality of consecutive punching operations in fixed spaced relation on the blank comprising a punch, means for vertically reciprocating the punch, and means for horizontally oscillating the punch so that during a part of the oscillatory movement the punch is moved in the same direction and at the same speed as that of the blank.

35. In an indexing punch press, a movable table for supporting a blank to be punched, means for continuously moving the table at uniform speed, and a punch mechanism for performing a plurality of consecutive punching operations in fixed spaced relation on the blank comprising a die disposed adjacent the table, a punch in cooperative relation with the die, means for reciprocating the punch, and means for oscillating the punch and the die so that no relative movement takes place between the rotating table and the oscillating die during a part of the oscillatory movement of the die and the punch.

36. In an indexing punch press, the combination of a rotatable table for supporting a blank to be punched, means for continuously rotating the table at uniform speed, a punch, a crosshead supporting the punch, a punch shaft having an eccentric for reciprocating the crosshead, means for driving the punch shaft, and means for oscillating the punch so that during the actual punching operation the punch is moved in the same direction and at the same speed as that of the table.

37. In an indexing punch press, the combination of a rotatable table for supporting a blank to be punched, drive means for rotating the table at uniform speed, a punch, a crosshead supporting the punch, a punch shaft having an eccentric for reciprocating the crosshead, means for driving the punch shaft in a predetermined relation to the movement of the table, and means for oscillating the punch so that during the actual punching operation no relative movement takes place between the punch and the table in the direction of the table rotation, said oscillating means comprising a guide for the punch, a carriage secured to the guide and centered on the rotatable table and means for oscillating the carriage including a cam having a helically shaped surface and being driven in response to movement of the punch shaft.

38. In an indexing punch press, the combination of a rotatable table for supporting a blank to be punched, means for preventing relative movement between the rotatable table and such blank, means for rotating the table at uniform speed, a punch, means for continuously reciprocating the punch to perform a succession of punching operations in fixed spaced relation on the blank, and means for temporarily preventing the punch from engaging the blank during its reciprocating movement to permit withdrawing of the punched blank and feeding of another blank.

39. In an indexing punch press, the combination of a movable table for supporting a blank to be punched, means for securely holding such blank on the movable table during the punching operation, a drive mechanism for moving the table at uniform speed, a punch shaft having an eccentric, reciprocating means including a punch mounted on the eccentric for performing a plurality of punching operations in fixed spaced relation on the blank, and means for raising the punch shaft to render the reciprocating punch movement ineffective and to permit withdrawing of the punched blank.

40. In an indexing punch press, the combination of a movable table, means for moving the table at uniform speed, punching means for automatically performing a certain number of consecutive punching operations in fixed, spaced relation on a blank held on and moving with the table, said punching means comprising a punch, means for reciprocating the punch in predetermined relation to the movement of the table, and means for automatically retracting the reciprocating means at the end of such certain number of punching operations to prevent engagement between the punch and the blank and to permit the withdrawing of the punched blank and the supply of another blank to be punched.

41. In an indexing punch press, the combination of a movable table, means for moving the table at uniform speed, means for securing a blank to be punched on the movable table, a punch, a crosshead supporting the punch, means including a punch shaft for reciprocating the cross-head in response to movement of the table to perform a succession of punching operations in fixed spaced relation on said blank, means including an eccentric bushing for supporting the punch shaft, and means for rotating the eccentric bushing to prevent engagement between the punch and the blank.

42. In an indexing punch press, a movable table, a drive mechanism for moving the table at uniform speed, means for securely holding a blank to be punched on the movable table, a drive shaft, a punch, a crosshead supporting the punch, a punch shaft movable into and out of alignment with the drive shaft for reciprocating the crosshead, a universal coupling between said shafts, and means for moving the punch shaft away from the movable table to prevent engagement between the punch and the blank.

43. In an indexing punch press, the combination of a movable table, drive means for moving the table at uniform speed, means for holding a blank to be punched on the table to prevent relative movement between the blank and the table, and means for performing a predetermined number of punching operations in fixed spaced relation on the blank, said means comprising a drive shaft rotatable in predetermined relation to the table movement, a punch shaft having an eccentric portion, a universal coupling between said shafts, a crosshead with a punch held on the eccentric portion, an eccentric bushing for supporting the punch shaft, and means for automatically rotating the eccentric bushing to retract the punch from the blank.

44. In an indexing punch press, the combination of a drive shaft, a punch shaft having an eccentric and being movable in and out of alignment with the drive shaft, a universal coupling between said shafts, a crosshead mounted on the eccentric whereby the crosshead is reciprocated during rotation of the punch shaft, a punch held on the crosshead with a clearance between the punch and the crosshead permitting relative sidewise movement therebetween, a die in cooperative relation with the punch, means including an oscillating cam on the drive shaft for oscillating the punch and the die, and means driven in response to movement of the drive shaft for moving a blank to be punched at uniform speed between the punch and the die, said cam being shaped such that during a part of the oscillatory movement of the punch and the die both the punch and the die are moved in the same direction and at the same speed as that of the blank.

45. In an indexing punch press, the combination of a punch shaft, means for driving the punch shaft, a punch, means including the punch shaft for reciprocating the punch, a die in cooperative relation with the punch, means for automatically oscillating the punch and the die in response to movement of the punch shaft, and a table for moving a blank to be punched at predetermined speed between the punch and the die, the arrangement being such that during a part of the oscillatory movement the punch and the die are moved with the table to eliminate relative movement between the punch, the die and the table while the punch engages the blank.

46. In an indexing punch press, the combination of a punch, means for reciprocating the punch, means for lowering and raising the reciprocating means, a die in cooperative relation with the punch, a carriage for supporting the die, means for oscillating the carriage including a cam movable in a determined relation with the rotation of the punch shaft, means for oscillating the punch comprising a guide engaging the punch and being fixed to the carriage, a table for moving a blank to be punched between the punch and the die in response to movement of the punch shaft, and a stripper having a portion intermediate the punch and the die for stripping the punch and another portion guided by the guide.

47. In an indexing punch press, the combination of a movable table, means for moving the table at uniform speed, a punch, means for reciprocating the punch, a stripper in cooperative relation with the punch, means for raising and lowering the punch and means for oscillating the punch and the stripper in determined relation to the movement of the reciprocating means, the oscillating arrangement being such that the speed and the direction of the oscillatory motion of the punch and the stripper are the same as that of the table during engagement of the punch and the blank.

48. In a punch press, the combination of a rotatable table for supporting a blank to be punched, means for rotating the table at uniform speed, means for preventing relative movement between the table and such blank, and a mechanism for performing a predetermined number of punching operations in spaced relation on the blank, said mechanism comprising a punch, means including a punch shaft for reciprocating the punch, means for automatically lowering and raising the punch shaft, means for driving the punch shaft in determined relation to the movement of the table, and means for oscillating the punch to cause the punch during the working stroke to move in the same direction and with the same speed as that of the table, the oscillating means comprising a carriage centered on the table, a punch guide secured to the carriage, and an oscillating cam movable in a determined relation to the movement of the punch shaft.

49. In an indexing punch press, the combination of a rotatable table, means for rotating the table, means for automatically placing a blank to be punched on the table, means for securing the blank on the table comprising a plug with a key disposed in an opening on the table, and means for automatically raising the plug and the key to project into a notched opening of the blank.

50. In an indexing punch press, the combination of a rotatable table, means for rotating the table at uniform speed, means for automatically moving a blank onto the table, means for automatically holding and positioning the blank on the rotatable table comprising a plug, a sleeve secured to the plug and projecting through a central bore of the table, and means for automatically raising the sleeve to cause the plug to project into an opening of the blank.

51. In an indexing punch press, the combination of a rotatable table, means for rotating the table at uniform speed, means for automatically moving a blank onto the table, means for automatically holding and positioning the blank on the rotatable table comprising a conical plug, a sleeve secured to the plug and projecting through a central bore of the table, means for automatically raising the sleeve to cause the plug to project into an opening of the blank, a key slidably disposed in a slot of the plug, means connected to the key for automatically positioning the key to project into a notch of the blank opening.

52. In an indexing punch press, the combination of a stationary table for supporting a blank, a rotatable table adjacent the stationary table, drive means for rotating the rotatable table at uniform speed, means for automatically moving the blank from the stationary table to the rotatable table, means for securing the blank to the rotatable table, the blank having an outer portion projecting radially beyond the rotatable table, a punch disposed above said outer blank portion, a die in cooperative relation with the punch disposed below and slidably engaging said outer blank portion, means for reciprocating the punch in a definite relation to the table movement, and means for oscillating the punch and the die in a predetermined relation to the reciprocating movement.

53. In an indexing punch press, the combination of a rotatable table for centrally supporting an annular blank having a portion projecting radially beyond the table, means for rotating the table at uniform speed, means for performing a succession of punching operations in fixed spaced relation on said projecting blank portion comprising a punch disposed above the projecting blank portion, means including a punch shaft with an eccentric intermediate portion for reciprocating the punch, means including an eccentric bushing on each side of the eccentric for supporting the punch shaft, and means for automatically lowering and raising the punch shaft comprising another shaft, means for driving the other shaft, and torque transmitting means between the other shaft and the eccentric bushings.

54. In an indexing punch press, the combination of a rotatable table, a cam shaft, means for driving the cam shaft, means for rotating the rotatable table in response to rotation of the cam shaft, means for automatically moving a blank to be punched onto the rotatable table, means including cam means on the cam shaft for automatically securing the blank to the rotatable table, and means for performing a succession of spaced punching operations on the blank comprising a punch, and means for reciprocating and oscillating the punch in determined relation to the table movement.

55. In a machine for automatically performing a succession of deforming operations on a piece of material, the combination of a support, means for holding a piece of material on the support, a tool for deforming the piece of material, means for continuously moving the support, and means for simultaneously actuating the tool to form a succession of predetermined deformations on the piece of material, the last named means including a mechanism for moving the tool during the actual deforming operation in the direction and at the rate of the movement of the support.

56. In a punch press, the combination of a support, means for holding on the support a piece of material to be punched, means for continuously moving the support at a definite speed, a tool, and a mechanism for actuating the tool, said mechanism including means for forcing the tool towards and into the piece of material and other means for moving the tool in direction and at the rate of the movement of the piece of material.

WILBUR L. MERRILL.
FREDERICK E. FISHER.